United States Patent
Logue et al.

(10) Patent No.: US 9,112,790 B2
(45) Date of Patent: Aug. 18, 2015

(54) FABRIC NETWORK

(71) Applicant: Google Inc., Mountain View, CA (US)

(72) Inventors: Jay D. Logue, San Jose, CA (US); Grant M. Erickson, Sunnyvale, CA (US); Zachary B. Smith, San Francisco, CA (US); Osborne B. Hardison, Palo Alto, CA (US); Richard J. Schultz, Mountain View, CA (US); Sunny P. Gujjaru, Sunnyvale, CA (US); Matthew G. Neeley, San Mateo, CA (US)

(73) Assignee: Google Inc., Mountain View, CA (US)

( * ) Notice: Subject to any disclaimer, the term of this patent is extended or adjusted under 35 U.S.C. 154(b) by 29 days.

(21) Appl. No.: 13/926,302

(22) Filed: Jun. 25, 2013

(65) Prior Publication Data

US 2014/0379817 A1    Dec. 25, 2014

(51) Int. Cl.
| | | |
|---|---|---|
| *G06F 15/16* | (2006.01) | |
| *H04L 12/931* | (2013.01) | |
| *H04L 29/06* | (2006.01) | |
| *H04L 12/28* | (2006.01) | |
| *H04L 29/08* | (2006.01) | |
| *H04L 12/26* | (2006.01) | |
| *G06F 12/00* | (2006.01) | |

(52) U.S. Cl.
CPC ............ *H04L 49/20* (2013.01); *H04L 12/2807* (2013.01); *H04L 29/06* (2013.01); *H04L 43/0805* (2013.01); *H04L 49/355* (2013.01); *H04L 67/10* (2013.01); *H04L 67/147* (2013.01); *H04L 69/22* (2013.01)

(58) Field of Classification Search
USPC ................... 709/203, 206–207, 223–229, 250
See application file for complete search history.

(56) References Cited

U.S. PATENT DOCUMENTS

| | | | |
|---|---|---|---|
| 2002/0085589 A1* | 7/2002 | Dravida et al. ................ | 370/503 |
| 2007/0171924 A1* | 7/2007 | Eisner et al. .................. | 370/401 |
| 2008/0188963 A1 | 8/2008 | McCoy | |
| 2010/0232317 A1 | 9/2010 | Jing et al. | |
| 2011/0231546 A1* | 9/2011 | Nathanson ..................... | 709/224 |
| 2013/0044749 A1* | 2/2013 | Eisner et al. .................. | 370/392 |
| 2013/0083805 A1 | 4/2013 | Lu et al. | |

FOREIGN PATENT DOCUMENTS

WO    2006135758 A1    12/2006

OTHER PUBLICATIONS

International Search Report and Written Opinion for PCT Application No. PCT/US2014/043695 dated Sep. 11, 2014; 14 pgs.

* cited by examiner

*Primary Examiner* — Zarni Maung

(57) ABSTRACT

Systems and methods relating to communication within a fabric network are presented. The fabric network includes one or more logical networks that enables devices connected to the fabric to communicate with each other using various profiles known to the devices. A device sending a message may follow a general message format to encode the message so that other devices in the fabric may understand the message regardless of which logical networks the devices are connected to. Within the message format, a payload of data may be included for the receiving device to forward, store, or process the message. The format and the contents of the payload may vary according to a header within the payload that indicates a profile and a message type within the profile. Using the profile and message type, the receiving devices may decode the message to process the message.

21 Claims, 22 Drawing Sheets

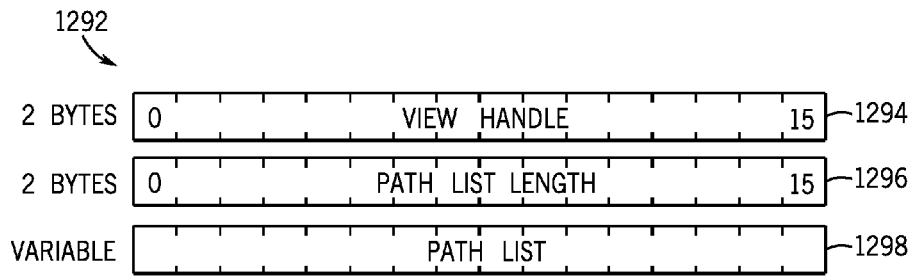
FIG. 31
```
FOO PROFILE
ANIMAL:
    FISH:
        MEDIUM:
        SIZE:
    FOWL:
        MEDIUM:
        SIZE:
BICYCLE:
    ROAD:
        # OF GEARS:
        SIZE:
        WEIGHT:
    MOUNTAIN:
        # OF GEARS:
        SIZE:
        WEIGHT:
    TRACK:
        # OF GEARS:
        SIZE:
        WEIGHT:
```
FIG. 32
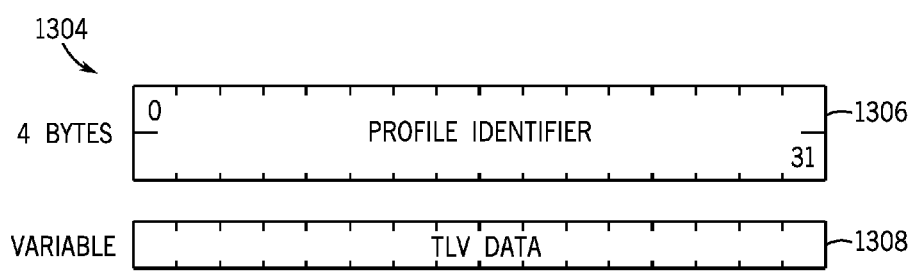
FIG. 33

FABRIC NETWORK

BACKGROUND

This disclosure relates to a fabric network that couples electronic devices using one or more network types.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Network-connected devices appear throughout homes. Some of these devices are often capable of communicating with each other through a single network type (e.g., WiFi connection) using a transfer protocol. It may be desired to use less power intensive connection protocols for some devices that are battery powered or receive a reduced charge. However, in some scenarios, devices connected to a lower power protocol may not be able to communicate with devices connected to a higher power protocol (e.g., WiFi).

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems and methods a fabric network that includes one or more logical networks that enables devices connected to the fabric to communicate with each other using a list of protocols and/or profiles known to the devices. The communications between the devices may follow a typical message format that enables the devices to understand communications between the devices regardless of which logical networks the communicating devices are connected to in the fabric. Within the message format, a payload of data may be included for the receiving device to store and/or process. The format and the contents of the payload may vary according to a header within the payload that indicates a profile (including one or more protocols) and/or a type of message that is being sent according to the profile.

According to some embodiments, two or more devices in a fabric may communicate using status reporting protocols or profiles. For example, in certain embodiments, a status reporting protocol or schema may be included in a core profile that is available to devices connected to the fabric. Using the status reporting protocol, devices may send or request status information to or from other devices in the fabric.

Similarly, in certain embodiments, two or more devices in a fabric may communicate using update software protocols or profiles. In some embodiments, the update software protocol or schema may be included in a core profile that is available to devices connected to the fabric. Using the update software protocol, devices may request, send, or notify the presence of updates within the fabric.

In certain embodiments, two or more devices in a fabric may communicate using data management protocols or profiles. In some embodiments, the data management protocol or schema may be included in a core profile that is available to devices connected to the fabric. Using the update data management protocol, devices may request, view, or track node-resident information that is stored in other devices.

Furthermore, in certain embodiments, two or more devices in a fabric may transfer data using bulk data transfer protocols or profiles. In some embodiments, the bulk data transfer protocol or schema may be included in a core profile that is available to devices connected to the fabric. Using the bulk data transfer protocol, devices may initiate, send, or receive bulk data using any logical networks in the fabric. In certain embodiments, either a sending or a receiving device using the bulk data transfer protocol may be able to "drive" a synchronous transfer between the devices. In other embodiments, the bulk transfer may be performed with an asynchronous transfer.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 31 illustrates a snapshot request frame that may be used in the sequence of FIG. 30, in accordance with an embodiment;

FIG. 32 illustrates an example profile schema that may be accessed using the snapshot request frame of FIG. 31, in accordance with an embodiment;

FIG. 33 is a binary format of a path that may indicate a path in a profile schema, in accordance with an embodiment;

DETAILED DESCRIPTION

Figure 1:
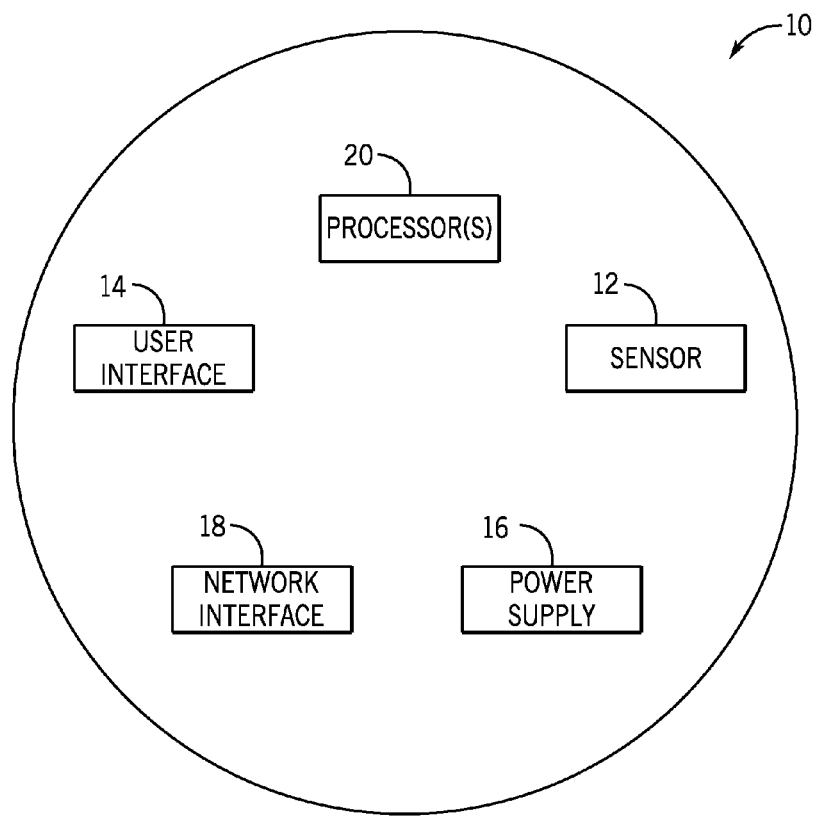
FIG. 1 is a block diagram of an electronic device having that may be interconnected with other devices using a fabric network, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure relate generally to an efficient fabric network that may be used by devices and/or services communicating with each other in a home environment. Generally, consumers living in homes may find it useful to coordinate the operations of various devices within their home such that all of their devices are operated efficiently. For example, a thermostat device may be used to detect a temperature of a home and coordinate the activity of other devices (e.g., lights) based on the detected temperature. In this example, the thermostat device may detect a temperature that may indicate that the temperature outside the home corresponds to daylight hours. The thermostat device may then convey to the light device that there may be daylight available to the home and that thus the light should turn off.

In addition to operating these devices efficiently, consumers generally prefer to use user-friendly devices that involve a minimum amount of set up or initialization. That is, consumers may generally prefer to purchase devices that are fully operational after performing a few number initialization steps that may be performed by almost any individual regardless of age or technical expertise.

With the foregoing in mind, to enable to effectively communicate data between each other within the home environment, the devices may use a fabric network that includes one or more logical networks to manage communication between the devices. That is, the efficient fabric network may enable numerous devices within a home to communicate with each other using one or more logical networks. The communication network may support Internet Protocol version 6 (IPv6) communication such that each connected device may have a unique local address (LA). Moreover, to enable each device to integrate with a home, it may be useful for each device to communicate within the network using low amounts of power. That is, by enabling devices to communicate using low power, the devices may be placed anywhere in a home without being coupled to a continuous power source (e.g., battery-powered).

I. Fabric Introduction

By way of introduction, FIG. 1 illustrates an example of a general device 10 that may that may communicate with other like devices within a home environment. In one embodiment, the device 10 may include one or more sensors 12, a user-interface component 14, a power supply 16 (e.g., including a power connection and/or battery), a network interface 18, a processor 20, and the like. Particular sensors 12, user-interface components 14, and power-supply configurations may be the same or similar with each devices 10. However, it should be noted that in some embodiments, each device 10 may include particular sensors 12, user-interface components 14, power-supply configurations, and the like based on a device type or model.

The sensors 12, in certain embodiments, may detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 12 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver(s) or radiofrequency identification detector(s). While FIG. 1 illustrates an embodiment with a single sensor, many embodiments may include multiple sensors. In some instances, the device 10 may includes one or more primary sensors and one or more secondary sensors. Here, the primary sensor(s) may sense data central to the core operation of the device (e.g., sensing a temperature in a thermostat or sensing smoke in a smoke detector), while the secondary sensor(s) may sense other types of data (e.g., motion, light or sound), which can be used for energy-efficiency objectives or smart-operation objectives.

One or more user-interface components 14 in the device 10 may receive input from the user and/or present information to the user. The user-interface component 14 may also include one or more user-input components that may receive information from the user. The received input may be used to determine a setting. In certain embodiments, the user-input components may include a mechanical or virtual component that responds to the user's motion. For example, the user can mechanically move a sliding component (e.g., along a vertical or horizontal track) or rotate a rotatable ring (e.g., along a circular track), the user's motion along a touchpad may be detected, or motions/gestures may be detected using a contactless gesture detection sensor (e.g., infrared sensor or camera). Such motions may correspond to a setting adjustment, which can be determined based on an absolute position of a user-interface component 104 or based on a displacement of a user-interface components 104 (e.g., adjusting a setpoint temperature by 1 degree F. for every 10° rotation of a rotatable-ring component). Physically and virtually movable user-input components can allow a user to set a setting along a portion of an apparent continuum. Thus, the user may not be confined to choose between two discrete options (e.g., as would be the case if up and down buttons were used) but can quickly and intuitively define a setting along a range of possible setting values. For example, a magnitude of a movement of a user-input component may be associated with a magnitude of a setting adjustment, such that a user may dramatically alter a setting with a large movement or finely tune a setting with s small movement.

The user-interface components 14 may also include one or more buttons (e.g., up and down buttons), a keypad, a number pad, a switch, a microphone, and/or a camera (e.g., to detect gestures). In one embodiment, the user-input component 14 may include a click-and-rotate annular ring component that may enable the user to interact with the component by rotating the ring (e.g., to adjust a setting) and/or by clicking the ring inwards (e.g., to select an adjusted setting or to select an option). In another embodiment, the user-input component 14 may include a camera that may detect gestures (e.g., to indicate that a power or alarm state of a device is to be changed). In some instances, the device 10 may have one primary input component, which may be used to set various types of settings. The user-interface components 14 may also be configured to present information to a user via, e.g., a visual display (e.g., a thin-film-transistor display or organic light-emitting-diode display) and/or an audio speaker.

The power-supply component 16 may include a power connection and/or a local battery. For example, the power connection may connect the device 10 to a power source such as a line voltage source. In some instances, an AC power source can be used to repeatedly charge a (e.g., rechargeable) local battery, such that the battery may be used later to supply power to the device 10 when the AC power source is not available. In certain embodiments, the power supply component 16 may include intermittent or reduced power connections that may be less than that provided via an AC plug in the home. In certain embodiments, devices with batteries and/or intermittent or reduced power may be operated as "sleepy devices" that alternate between an online/awake state and an offline/sleep state to reduce power consumption.

The network interface 18 may include one or more components that enable the device 10 to communicate between devices using one or more logical networks within the fabric network. In one embodiment, the network interface 18 may communicate using an efficient network layer as part of its Open Systems Interconnection (OSI) model. In certain embodiments, one component of the network interface 18 may communicate with one logical network (e.g., WiFi) and another component of the network interface may communicate with another logical network (e.g., 802.15.4). In other words, the network interface 18 may enable the device 10 to wirelessly communicate via multiple IPv6 networks. As such, the network interface 18 may include a wireless card, Ethernet port, and/or other suitable transceiver connections.

The processor 20 may support one or more of a variety of different device functionalities. As such, the processor 20 may include one or more processors configured and programmed to carry out and/or cause to be carried out one or more of the functionalities described herein. In one embodiment, the processor 20 may include general-purpose processors carrying out computer code stored in local memory (e.g., flash memory, hard drive, random access memory), special-purpose processors or application-specific integrated circuits, other types of hardware/firmware/software processing platforms, and/or some combination thereof. Further, the processor 20 may be implemented as localized versions or counterparts of algorithms carried out or governed remotely by central servers or cloud-based systems, such as by virtue of running a Java virtual machine (JVM) that executes instructions provided from a cloud server using Asynchronous Javascript and XML (AJAX) or similar protocols. By way of example, the processor 20 may detect when a location (e.g., a house or room) is occupied, up to and including whether it is occupied by a specific person or is occupied by a specific number of people (e.g., relative to one or more thresholds). In one embodiment, this detection can occur, e.g., by analyzing microphone signals, detecting user movements (e.g., in front of a device), detecting openings and closings of doors or garage doors, detecting wireless signals, detecting an IP address of a received signal, detecting operation of one or more devices within a time window, or the like. Moreover, the processor 20 may include image recognition technology to identify particular occupants or objects.

In some instances, the processor 20 may predict desirable settings and/or implement those settings. For example, based on presence detection, the processor 20 may adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), the processor 20 may initiate an audio or visual indicator of where the person, animal or object is or may initiate an alarm or security feature if an unrecognized person is detected under certain conditions (e.g., at night or when lights are off).

In some instances, devices may interact with each other such that events detected by a first device influences actions of a second device using one or more common profiles between the devices. For example, a first device can detect that a user has pulled into a garage (e.g., by detecting motion in the garage, detecting a change in light in the garage or detecting opening of the garage door). The first device can transmit this information to a second device via the fabric network, such that the second device can, e.g., adjust a home temperature setting, a light setting, a music setting, and/or a security-alarm setting. As another example, a first device can detect a user approaching a front door (e.g., by detecting motion or sudden light pattern changes). The first device may cause a general audio or visual signal to be presented (e.g., such as sounding of a doorbell) or cause a location-specific audio or visual signal to be presented (e.g., to announce the visitor's presence within a room that a user is occupying).

Figure 2:
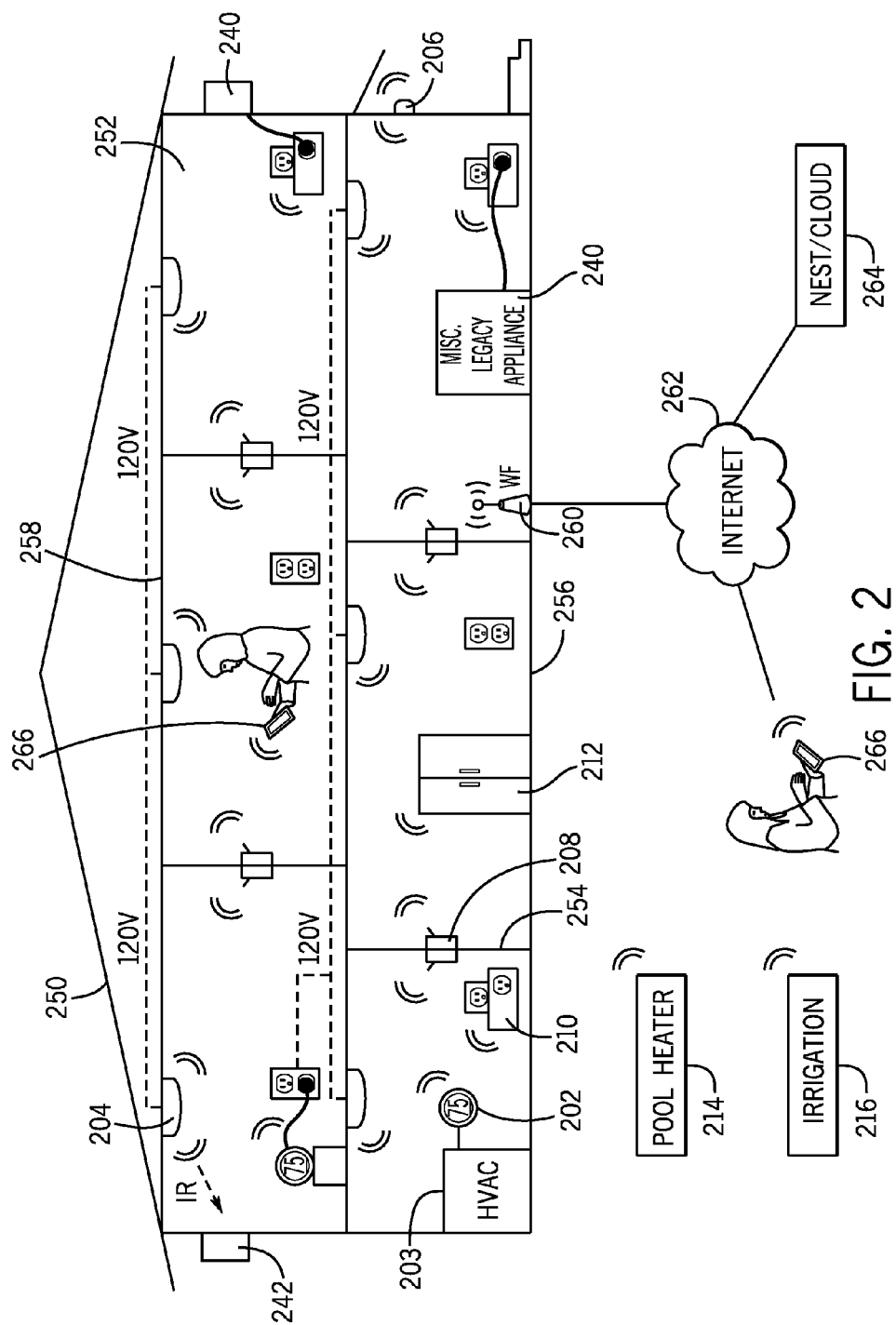
FIG. 2 illustrates a block diagram of a home environment in which the general device of FIG. 1 may communicate with other devices via the fabric network, in accordance with an embodiment.
Figure 3:
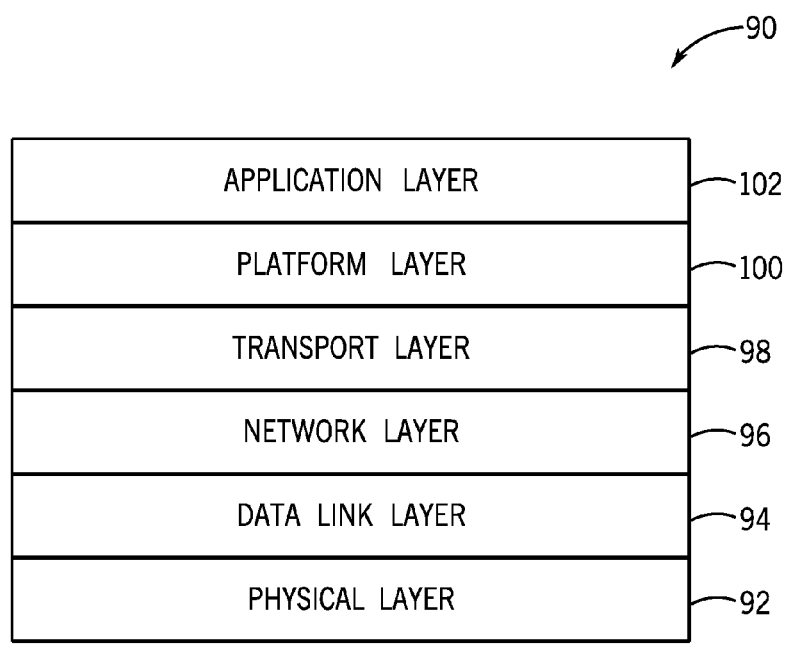
FIG. 3 illustrates a block diagram of an Open Systems Interconnection (OSI) model that characterizes a communication system for the home environment of FIG. 2, in accordance with an embodiment.

With the foregoing in mind, FIG. 2 illustrates a block diagram of a home environment 30 in which the device 10 of FIG. 1 may communicate with other devices via the fabric network. The depicted home environment 30 may include a structure 32 such as a house, office building, garage, or mobile home. It will be appreciated that devices can also be integrated into a home environment that does not include an entire structure 32, such as an apartment, condominium, office space, or the like. Further, the home environment 30 may control and/or be coupled to devices outside of the actual structure 32. Indeed, several devices in the home environment 30 need not physically be within the structure 32 at all. For example, a device controlling a pool heater 34 or irrigation system 36 may be located outside of the structure 32.

The depicted structure 32 includes multiple rooms 38, separated at least partly from each other via walls 40. The walls 40 can include interior walls or exterior walls. Each room 38 can further include a floor 42 and a ceiling 44. Devices can be mounted on, integrated with and/or supported by the wall 40, the floor 42, or the ceiling 44.

The home environment 30 may include multiple devices, including intelligent, multi-sensing, network-connected devices that may integrate seamlessly with each other and/or with cloud-based server systems to provide any of a variety of useful home objectives. One, more or each of the devices illustrated in the home environment 30 may include one or more sensors 12, a user interface 14, a power supply 16, a network interface 18, a processor 20 and the like.

Example devices 10 may include a network-connected thermostat 46 that may detect ambient climate characteristics (e.g., temperature and/or humidity) and control a heating, ventilation and air-conditioning (HVAC) system 48. Another example device 10 may include a hazard detection unit 50 that can detect the presence of a hazardous substance and/or a hazardous condition in the home environment 30 (e.g., smoke, fire, or carbon monoxide). Additionally, entryway interface devices 52, which can be termed a "smart doorbell", can detect a person's approach to or departure from a location, control audible functionality, announce a person's approach or departure via audio or visual means, or control settings on a security system (e.g., to activate or deactivate the security system).

In certain embodiments, the device 10 may include a light switch 54 that may detect ambient lighting conditions, detect room-occupancy states, and control a power and/or dim state of one or more lights. In some instances, the light switches 54 may control a power state or speed of a fan, such as a ceiling fan.

Additionally, wall plug interfaces 56 may detect occupancy of a room or enclosure and control supply of power to one or more wall plugs (e.g., such that power is not supplied to the plug if nobody is at home). The device 10 within the home environment 30 may further include an appliance 58, such as refrigerators, stoves and/or ovens, televisions, washers, dryers, lights (inside and/or outside the structure 32), stereos, intercom systems, garage-door openers, floor fans, ceiling fans, whole-house fans, wall air conditioners, pool heaters 34, irrigation systems 36, security systems, and so forth. While descriptions of FIG. 2 may identify specific sensors and functionalities associated with specific devices, it will be appreciated that any of a variety of sensors and functionalities (such as those described throughout the specification) may be integrated into the device 10.

In addition to containing processing and sensing capabilities, each of the example devices described above may be capable of data communications and information sharing with any other device, as well as to any cloud server or any other device that is network-connected anywhere in the world. In one embodiment, the devices 10 may send and receive communications via a fabric network discussed below. In one embodiment, fabric may enable the devices 10 to communicate with each other via one or more logical networks. As such, certain devices may serve as wireless repeaters and/or may function as bridges between devices, services, and/or logical networks in the home environment that may not be directly connected (i.e., one hop) to each other.

In one embodiment, a wireless router 60 may further communicate with the devices 10 in the home environment 30 via one or more logical networks (e.g., WiFi). The wireless router 60 may then communicate with the Internet 62 or other network such that each device 10 may communicate with a remote service or a cloud-computing system 64 through the Internet 62. The cloud-computing system 64 may be associated with a manufacturer, support entity or service provider associated with a particular device 10. As such, in one embodiment, a user may contact customer support using a device itself rather than using some other communication means such as a telephone or Internet-connected computer. Further, software updates can be automatically sent from the cloud-computing system 64 or devices in the home environment 30 to other devices in the fabric (e.g., when available, when purchased, when requested, or at routine intervals).

By virtue of network connectivity, one or more of the devices 10 may further allow a user to interact with the device even if the user is not proximate to the device. For example, a user may communicate with a device using a computer (e.g., a desktop computer, laptop computer, or tablet) or other portable electronic device (e.g., a smartphone) 66. A webpage or application may receive communications from the user and control the device 10 based on the received communications. Moreover, the webpage or application may present information about the device's operation to the user. For example, the user can view a current setpoint temperature for a device and adjust it using a computer that may be connected to the Internet 62. In this example, the thermostat 46 may receive the current setpoint temperature view request via the fabric network via one or more underlying logical networks.

In certain embodiments, the home environment 30 may also include a variety of non-communicating legacy appliances 68, such as old conventional washer/dryers, refrigerators, and the like which can be controlled, albeit coarsely (ON/OFF), by virtue of the wall plug interfaces 56. The home environment 30 may further include a variety of partially communicating legacy appliances 70, such as infra-red (IR) controlled wall air conditioners or other IR-controlled devices, which can be controlled by IR signals provided by the hazard detection units 50 or the light switches 54.

Figure 4:
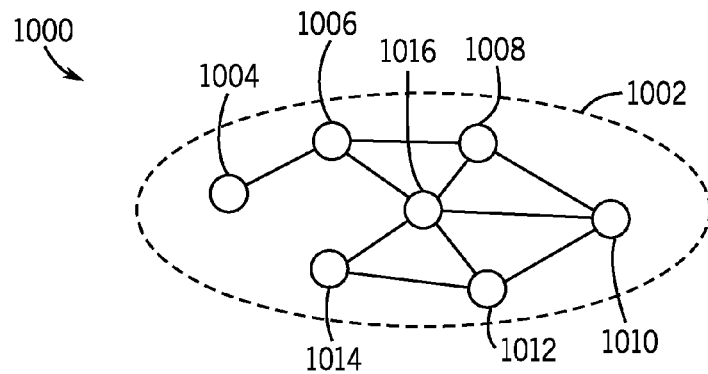
FIG. 4 illustrates the fabric network having a single logical network topology, in accordance with an embodiment.

As mentioned above, each of the example devices 10 described above may form a portion of a fabric network. Generally, the fabric network may be part of an Open Systems Interconnection (OSI) model 90 as depicted in FIG. 4. The OSI model 90 illustrates functions of a communication system with respect to abstraction layers. That is, the OSI model may specify a networking framework or how communications between devices may be implemented. In one embodiment, the OSI model may include six layers: a physical layer 92, a data link layer 94, a network layer 96, a transport layer 98, a platform layer 100, and an application layer 102. Generally, each layer in the OSI model 90 may serve the layer above it and may be served by the layer below it.

Keeping this in mind, the physical layer 92 may provide hardware specifications for devices that may communicate with each other. As such, the physical layer 92 may establish how devices may connect to each other, assist in managing how communication resources may be shared between devices, and the like.

The data link layer 94 may specify how data may be transferred between devices. Generally, the data link layer 94 may provide a way in which data packets being transmitted may be encoded and decoded into bits as part of a transmission protocol.

The network layer 96 may specify how the data being transferred to a destination node is routed. The network layer 96 may also provide a security protocol that may maintain the integrity of the data being transferred. The efficient network layer discussed above corresponds to the network layer 96. In certain embodiments, the network layer 96 may be completely independent of the platform layer 100 and include any suitable IPv6 network type (e.g., WiFi, Ethernet, HomePlug, 802.15.4, etc).

The transport layer 98 may specify a transparent transfer of the data from a source node to a destination node. The transport layer 98 may also control how the transparent transfer of the data remains reliable. As such, the transport layer 98 may be used to verify that data packets intended to transfer to the destination node indeed reached the destination node. Example protocols that may be employed in the transport layer 98 may include Transmission Control Protocol (TCP) and User Datagram Protocol (UDP).

The platform layer 100 includes the fabric network and establishes connections between devices according to the protocol specified within the transport layer 98 and may be agnostic of the network type used in the network layer 96. The platform layer 100 may also translate the data packets into a form that the application layer 102 may use. The application layer 102 may support a software application that may directly interface with the user. As such, the application layer 102 may implement protocols defined by the software application. For example, the software application may provide serves such as file transfers, electronic mail, and the like.

II. Fabric Device Interconnection

As discussed above, a fabric may be implemented using one or more suitable communications protocols, such as IPv6 protocols. In fact, the fabric may be partially or completely agnostic to the underlying technologies (e.g., network types or communication protocols) used to implement the fabric. Within the one or more communications protocols, the fabric may be implemented using one or more network types used to communicatively couple electrical devices using wireless or wired connections. For example, certain embodiments of the fabric may include Ethernet, WiFi, 802.15.4, ZigBee®, ISA100.11a, WirelessHART, MiWi™, power-line networks, and/or other suitable network types. Within the fabric devices (e.g., nodes) can exchange packets of information with other devices (e.g., nodes) in the fabric, either directly or via intermediary nodes, such as intelligent thermostats, acting as IP routers. These nodes may include manufacturer devices (e.g., thermostats and smoke detectors) and/or customer devices (e.g., phones, tablets, computers, etc.). Additionally, some devices may be "always on" and continuously powered using electrical connections. Other devices may have partially reduced power usage (e.g., medium duty cycle) using a reduced/intermittent power connection, such as a thermostat or doorbell power connection. Finally, some devices may have a short duty cycle and run solely on battery power. In other words, in certain embodiments, the fabric may include heterogeneous devices that may be connected to one or more sub-networks according to connection type and/or desired power usage. FIGS. A-C illustrate three embodiments that may be used to connect electrical devices via one or more sub-networks in the fabric.

A. Single Network Topology

FIG. 4 illustrates an embodiment of the fabric 1000 having a single network topology. As illustrated, the fabric 1000 includes a single logical network 1002. The network 1002 could include Ethernet, WiFi, 802.15.4, power-line networks, and/or other suitable network types in the IPv6 protocols. In fact, in some embodiments where the network 1002 includes a WiFi or Ethernet network, the network 1002 may span multiple WiFi and/or Ethernet segments that are bridged at a link layer.

The network 1002 includes one or more nodes 1004, 1006, 1008, 1010, 1012, 1014, and 1016, referred to collectively as 1004-1016. Although the illustrated network 1002 includes seven nodes, certain embodiments of the network 1002 may include one or more nodes interconnected using the network 1002. Moreover, if the network 1002 is a WiFi network, each of the nodes 1004-1016 may be interconnected using the node 1016 (e.g., WiFi router) and/or paired with other nodes using WiFi Direct (i.e., WiFi P2P).

B. Star Network Topology

Figure 5:
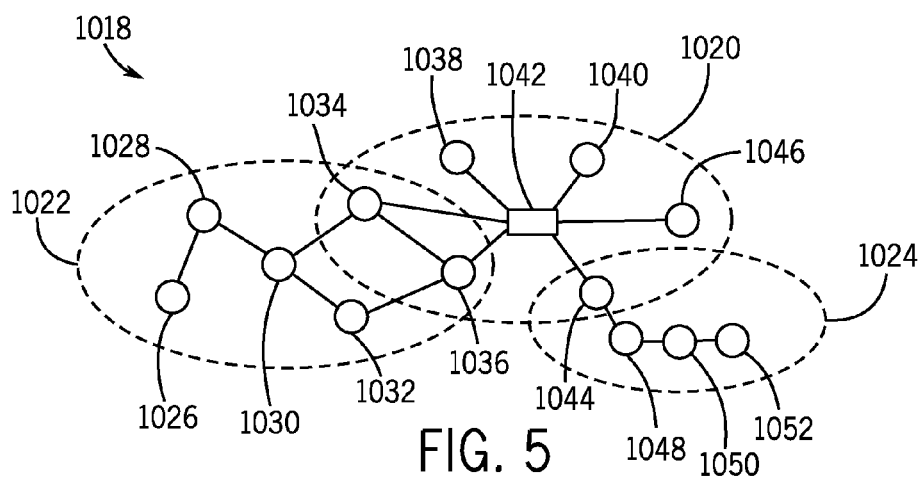
FIG. 5 illustrates the fabric network having a star network topology, in accordance with an embodiment.

FIG. 5 illustrates an alternative embodiment of fabric 1000 as a fabric 1018 having a star network topology. The fabric 1018 includes a hub network 1020 that joins together two periphery networks 1022 and 1024. The hub network 1020 may include a home network, such as WiFi/Ethernet network or power line network. The periphery networks 1022 and 1024 may additional network connection types different of different types than the hub network 1020. For example, in some embodiments, the hub network 1020 may be a WiFi/Ethernet network, the periphery network 1022 may include an 802.15.4 network, and the periphery network 1024 may include a power line network, a ZigBee® network, a ISA100.11a network, a WirelessHART, network, or a MiWi™ network. Moreover, although the illustrated embodiment of the fabric 1018 includes three networks, certain embodiments of the fabric 1018 may include any number of networks, such as 2, 3, 4, 5, or more networks. In fact, some embodiments of the fabric 1018 include multiple periphery networks of the same type.

Although the illustrated fabric 1018 includes fourteen nodes, each referred to individually by reference numbers 1024-1052, respectively, it should be understood that the fabric 1018 may include any number of nodes. Communication within each network 1020, 1022, or 1024, may occur directly between devices and/or through an access point, such as node 1042 in a WiFi/Ethernet network. Communications between periphery network 1022 and 1024 passes through the hub network 1020 using inter-network routing nodes. For example, in the illustrated embodiment, nodes 1034 and 1036 are be connected to the periphery network 1022 using a first network connection type (e.g., 802.15.4) and to the hub network 1020 using a second network connection type (e.g., WiFi) while the node 1044 is connected to the hub network 1020 using the second network connection type and to the periphery network 1024 using a third network connection type (e.g., power line). For example, a message sent from node 1026 to node 1052 may pass through nodes 1028, 1030, 1032, 1036, 1042, 1044, 1048, and 1050 in transit to node 1052.

C. Overlapping Networks Topology

Figure 6:
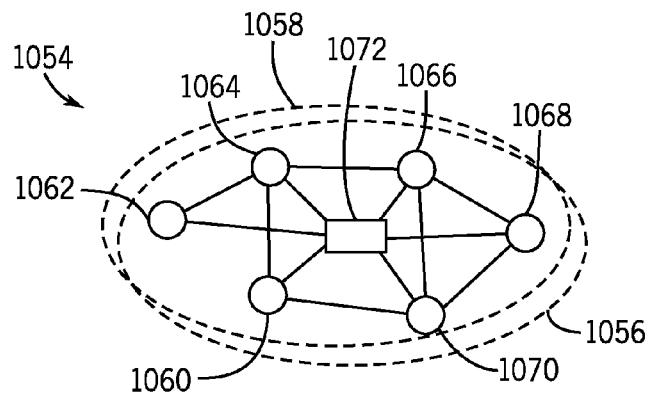
FIG. 6 illustrates the fabric network having an overlapping networks topology, in accordance with an embodiment.

FIG. 6 illustrates an alternative embodiment of the fabric 1000 as a fabric 1054 having an overlapping networks topology. The fabric 1054 includes networks 1056 and 1058. As illustrated, each of the nodes 1062, 1064, 1066, 1068, 1070, and 1072 may be connected to each of the networks. In other embodiments, the node 1072 may include an access point for an Ethernet/WiFi network rather than an end point and may not be present on either the network 1056 or network 1058, whichever is not the Ethernet/WiFi network. Accordingly, a communication from node 1062 to node 1068 may be passed through network 1056, network 1058, or some combination thereof. In the illustrated embodiment, each node can communicate with any other node via any network using any network desired. Accordingly, unlike the star network topology of FIG. 5, the overlapping networks topology may communicate directly between nodes via any network without using inter-network routing.

D. Fabric Network Connection to Services

Figure 7:
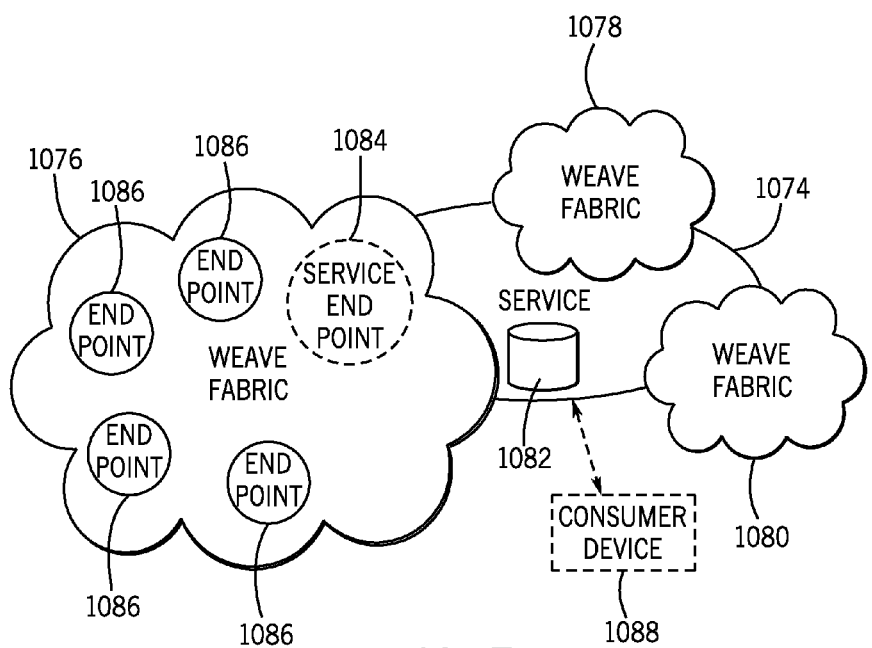
FIG. 7 illustrates a service communicating with one or more fabric networks, in accordance with an embodiment.

In addition to communications between devices within the home, a fabric (e.g., fabric 1000) may include services that may be located physically near other devices in the fabric or physically remote from such devices. The fabric connects to these services through one or more service end points. FIG. 7 illustrates an embodiment of a service 1074 communicating with fabrics 1076, 1078, and 1080. The service 1074 may include various services that may be used by devices in fabrics 1076, 1078, and/or 1080. For example, in some embodiments, the service 1074 may be a time of day service that supplies a time of day to devices, a weather service to provide various weather data (e.g., outside temperature, sunset, wind information, weather forecast, etc.), an echo service that "pings" each device, data management services, device management services, and/or other suitable services. As illustrated, the service 1074 may include a server 1082 (e.g., web server) that stores/accesses relevant data and passes the information through a service end point 1084 to one or more end points 1086 in a fabric, such as fabric 1076. Although the illustrated embodiment only includes three fabrics with a single server 1082, it should be appreciated that the service 1074 may connect to any number of fabrics and may include servers in addition to the server 1082 and/or connections to additional services.

In certain embodiments, the service 1074 may also connect to a consumer device 1088, such as a phone, tablet, and/or computer. The consumer device 1088 may be used to connect to the service 1074 via a fabric, such as fabric 1076, an Internet connection, and/or some other suitable connection method. The consumer device 1088 may be used to access data from one or more end points (e.g., electronic devices) in a fabric either directly through the fabric or via the service 1074. In other words, using the service 1074, the consumer device 1088 may be used to access/manage devices in a fabric remotely from the fabric.

E. Communication Between Devices in a Fabric

Figure 8:
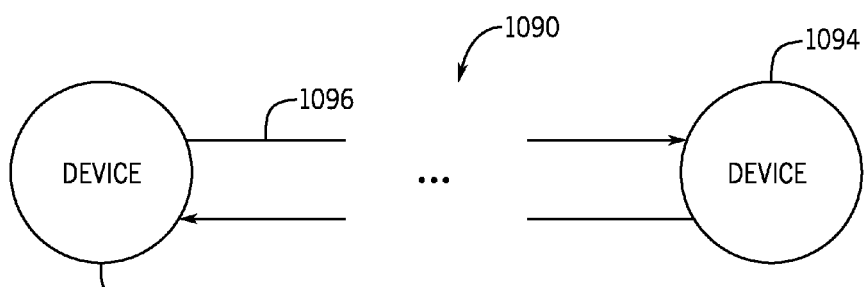
FIG. 8 illustrates two devices in a fabric network in communicative connection, in accordance with an embodiment.

As discussed above, each electronic device or node may communicate with any other node in the fabric, either directly or indirectly depending upon fabric topology and network connection types. Additionally, some devices (e.g., remote devices) may communicate through a service to communicate with other devices in the fabric. FIG. 8 illustrates an embodiment of a communication 1090 between two devices 1092 and 1094. The communication 1090 may span one or more networks either directly or indirectly through additional devices and/or services, as described above. Additionally, the communication 1090 may occur over an appropriate communication protocol, such as IPv6, using one or more transport protocols. For example, in some embodiments the communication 1090 may include using the transmission control protocol (TCP) and/or the user datagram protocol (UDP). In some embodiments, the device 1092 may transmit a first signal 1096 to the device 1094 using a connectionless protocol (e.g., UDP). In certain embodiments, the device 1092 may communicate with the device 1094 using a connection-oriented protocol (e.g., TCP). Although the illustrated communication 1090 is depicted as a bi-directional connection, in some embodiments, the communication 1090 may be a uni-directional broadcast.

i. Unique Local Address

As discussed above, data transmitted within a fabric received by a node may be redirected or passed through the node to another node depending on the desired target for the communication. In some embodiments, the transmission of the data may be intended to be broadcast to all devices. In such embodiments, the data may be retransmitted without further processing to determine whether the data should be passed along to another node. However, some data may be directed to a specific endpoint. To enable addressed messages to be transmitted to desired endpoints, nodes may be assigned identification information.

Each node may be assigned a set of link-local addresses (LLA), one assigned to each network interface. These LLAs may be used to communicate with other nodes on the same network. Additionally, the LLAs may be used for various communication procedures, such as IPv6 Neighbor Discovery Protocol. In addition to LLAs, each node is assigned a unique local address (ULA).

Figure 9:
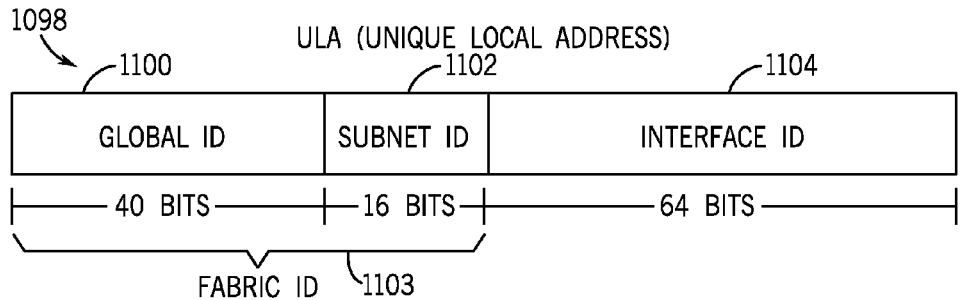
FIG. 9 illustrates a unique local address format (ULA) that may be used to address devices in a fabric network, in accordance with an embodiment.

FIG. 9 illustrates an embodiment of a unique local address (ULA) 1098 that may be used to address each node in the fabric. In certain embodiments, the ULA 1098 may be formatted as an IPv6 address format containing 128 bits divided into a global ID 1100, a subnet ID 1102, and an interface ID 1104. The global ID 1100 includes 40 bits and the subnet ID 1102 includes 16 bits. The global ID 1100 and subnet ID 1102 together form a fabric ID 1103 for the fabric.

The fabric ID 1103 is a unique 64-bit identifier used to identify a fabric. The fabric ID 1103 may be generated at creation of the associated fabric using a pseudo-random algorithm. For example, the pseudo-random algorithm may 1) obtain the current time of day in 64-bit NTP format, 2) obtain the interface ID 1104 for the device, 3) concatenate the time of day with the interface ID 1104 to create a key, 4) compute and SHA-1 digest on the key resulting in 160 bits, 5) use the least significant 40 bits as the global ID 1100, and 6) concatenate the ULA and set the least significant bit to 1 to create the fabric ID 1103. In certain embodiments, once the fabric ID 1103 is created with the fabric, the fabric ID 1103 remains until the fabric is dissolved.

The global ID 1100 identifies the fabric to which the node belongs. The subnet ID 1102 identifies logical networks within the fabric. The subnet ID F3 may be assigned monotonically starting at one with the addition of each new logical network to the fabric. For example, a WiFi network may be identified with a hex value of 0x01, and a later connected 802.15.4 network may be identified with a hex value of 0x02 continuing on incrementally upon the connection of each new network to the fabric.

Finally, the ULA 1098 includes an interface ID 1104 that includes 64 bits. The interface ID 1104 may be assigned using a globally-unique 64-bit identifier according to the IEEE EUI-64 standard. For example, devices with IEEE 802 network interfaces may derive the interface ID 1104 using a burned-in MAC address for the devices "primary interface." In some embodiments, the designation of which interface is the primary interface may be determined arbitrarily. In other embodiments, an interface type (e.g., WiFi) may be deemed the primary interface, when present. If the MAC address for the primary interface of a device is 48 bits rather than 64-bit, the 48-bit MAC address may be converted to a EUI-64 value via encapsulation (e.g., organizationally unique identifier encapsulating). In consumer devices (e.g., phones or computers), the interface ID 1104 may be assigned by the consumer devices' local operating systems.

ii. Routing Transmissions Between Logical Networks

As discussed above in relation to a star network topology, inter-network routing may occur in communication between two devices across logical networks. In some embodiments, inter-network routing is based on the subnet ID 1102. Each inter-networking node (e.g., node 1034 of FIG. 5) may maintain a list of other routing nodes (e.g., node B 14 of FIG. 5) on the hub network 1020 and their respective attached periphery networks (e.g., periphery network 1024 of FIG. 5). When a packet arrives addressed to a node other than the routing node itself, the destination address (e.g., address for node 1052 of FIG. 5) is compared to the list of network prefixes and a routing node (e.g., node 1044) is selected that is attached to the desired network (e.g., periphery network 1024). The packet is then forwarded to the selected routing node. If multiple nodes (e.g., 1034 and 1036) are attached to the same periphery network, routing nodes are selected in an alternating fashion.

Additionally, inter-network routing nodes may regularly transmit Neighbor Discovery Protocol (NDP) router advertisement messages on the hub network to alert consumer devices to the existence of the hub network and allow them to acquire the subnet prefix. The router advertisements may include one or more route information options to assist in routing information in the fabric. For example, these route information options may inform consumer devices of the existence of the periphery networks and how to route packets the periphery networks.

Figure 10:
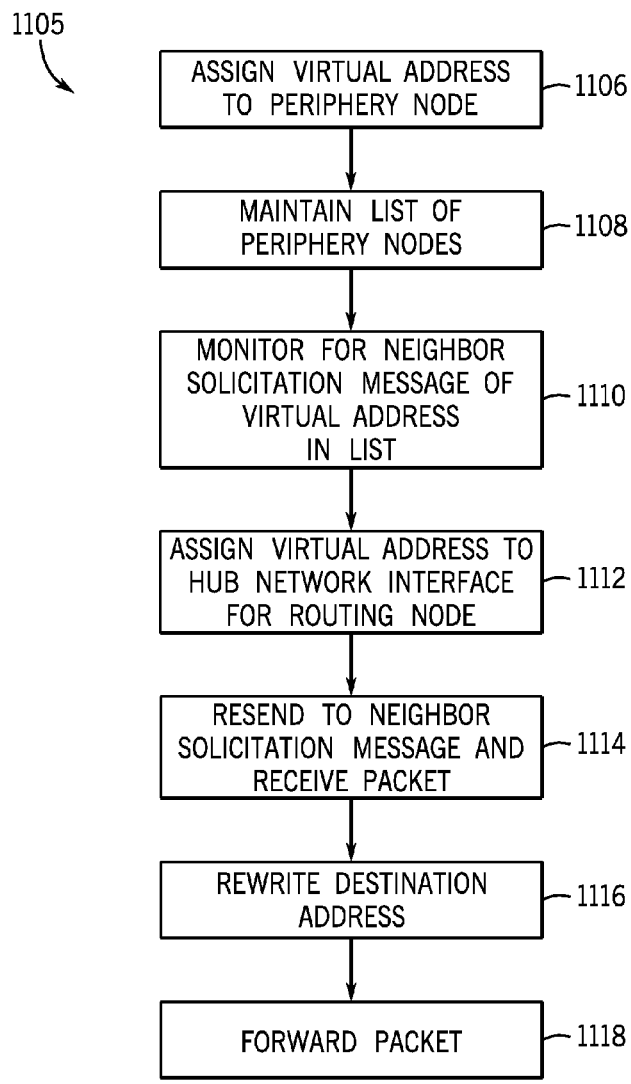
FIG. 10 illustrates a process for proxying periphery devices on a hub network, in accordance with an embodiment.

In addition to, or in place of route information options, routing nodes may act as proxies to provide a connection between consumer devices and devices in periphery networks, such as the process 1105 as illustrated in FIG. 10. As illustrated, the process 1105 includes each periphery network device being assigned a virtual address on the hub network by combining the subnet ID 1102 with the interface ID 1104 for the device on the periphery network (block 1106). To proxy using the virtual addresses, routing nodes maintain a list of all periphery nodes in the fabric that are directly reachable via one of its interfaces (block 1108). The routing nodes listen on the hub network for neighbor solicitation messages requesting the link address of a periphery node using its virtual address (block 1110). Upon receiving such a message, the routing node attempts to assign the virtual address to its hub interface after a period of time (block 1112). As part of the assignment, the routing node performs duplicate address detection so as to block proxying of the virtual address by more than one routing node. After the assignment, the routing node responds to the neighbor solicitation message and receives the packet (block 1114). Upon receiving the packet, the routing node rewrites the destination address to be the real address of the periphery node (block 1116) and forwards the message to the appropriate interface (block 1118).

iii. Consumer Devices Connecting to a Fabric

To join a fabric, a consumer device may discover an address of a node already in the fabric that the consumer device wants to join. Additionally, if the consumer device has been disconnected from a fabric for an extended period of time may need to rediscover nodes on the network if the fabric topology/layout has changed. To aid in discovery/rediscovery, fabric devices on the hub network may publish Domain Name System-Service Discovery (DNS-SD) records via mDNS that advertise the presence of the fabric and provide addresses to the consumer device

III. Data Transmitted in the Fabric

After creation of a fabric and address creation for the nodes, data may be transmitted through the fabric. Data passed through the fabric may be arranged in a format common to all messages and/or common to specific types of conversations in the fabric. In some embodiments, the message format may enable one-to-one mapping to JavaScript Object Notation (JSON) using a TLV serialization format discussed below. Additionally, although the following data frames are described as including specific sizes, it should be noted that lengths of the data fields in the data frames may be varied to other suitable bit-lengths.

It should be understood that each of the following data frames, profiles, and/or formats discussed below may be stored in memory (e.g., memory of the device 10) prior to and/or after transmission of a message. In other words, although the data frame, profiles, and formats may be generally discussed as transmissions of data, they may also be physically stored (e.g., in a buffer) before, during, and/or after transmission of the data frame, profiles, and/or formats. Moreover, the following data frames, profiles, schemas, and/or formats may be stored on a non-transitory, computer-readable medium that allows an electronic device to access the data frames, profiles, schemas, and/or formats. For example, instructions for formatting the data frames, profiles, schemas, and/or formats may be stored in any suitable computer-readable medium, such as in memory for the device 10, memory of another device, a portable memory device (e.g., compact disc, flash drive, etc.), or other suitable physical device suitable for storing the data frames, profiles, schemas, and/or formats.

A. Security

Along with data intended to be transferred, the fabric may transfer the data with additional security measures such as encryption, message integrity checks, and digital signatures. In some embodiments, a level of security supported for a device may vary according to physical security of the device and/or capabilities of the device. In certain embodiments, messages sent between nodes in the fabric may be encrypted using the Advanced Encryption Standard (AES) block cipher operating in counter mode (AES-CTR) with a 128-bit key. As discussed below, each message contains a 32-bit message id. The message id may be combined with a sending nodes id to form a nonce for the AES-CTR algorithm. The 32-bit counter enables 4 billion messages to be encrypted and sent by each node before a new key is negotiated.

In some embodiments, the fabric may insure message integrity using a message authentication code, such as HMAC-SHA-1, that may be included in each encrypted message. In some embodiments, the message authentication code may be generated using a 160-bit message integrity key that is paired one-to-one with the encryption key. Additionally, each node may check the message id of incoming messages against a list of recently received ids maintained on a node-by-node basis to block replay of the messages.

B. Tag Length Value (TLV) Formatting

To reduce power consumption, it is desirable to send at least a portion of the data sent over the fabric that compactly while enabling the data containers to flexibly represents data that accommodates skipping data that is not recognized or understood by skipping to the next location of data that is understood within a serialization of the data. In certain embodiments, tag-length-value (TLV) formatting may be used to compactly and flexibly encode/decode data. By storing at least a portion of the transmitted data in TLV, the data may be compactly and flexibly stored/sent along with low encode/decode and memory overhead, as discussed below in reference to Table 7. In certain embodiments, TLV may be used for some data as flexible, extensible data, but other portions of data that is not extensible may be stored and sent in an understood standard protocol data unit (PDU).

Data formatted in a TLV format may be encoded as TLV elements of various types, such as primitive types and container types. Primitive types include data values in certain formats, such as integers or strings. For example, the TLV format may encode: 1, 2, 3, 4, or 8 byte signed/unsigned integers, UTF-8 strings, byte strings, single/double-precision floating numbers (e.g., IEEE 754-1985 format), boolean, null, and other suitable data format types. Container types include collections of elements that are then sub-classified as container or primitive types. Container types may be classified into various categories, such as dictionaries, arrays, paths or other suitable types for grouping TLV elements, known as members. A dictionary is a collection of members each having distinct definitions and unique tags within the dictionary. An array is an ordered collection of members with implied definitions or no distinct definitions. A path is an ordered collection of members that described how to traverse a tree of TLV elements.

Figure 11:
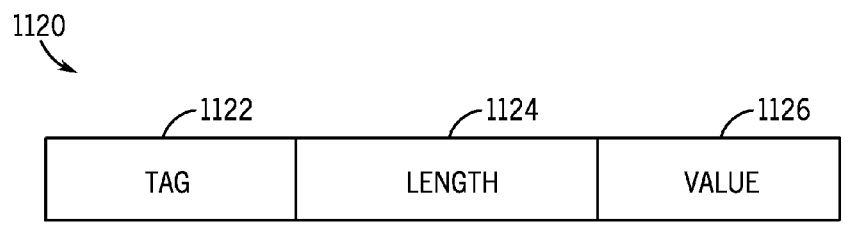
FIG. 11 illustrates a tag-length-value (TLV) packet that may be used to transmit data over the fabric network, in accordance with an embodiment.

As illustrated in FIG. 11, an embodiment of a TLV packet 1120 includes three data fields: a tag field 1122, a length field 1124, and a value field 1126. Although the illustrated fields 1122, 1124, and 1126 are illustrated as approximately equivalent in size, the size of each field may be variable and vary in size in relation to each other. In other embodiments, the TLV packet 1120 may further include a control byte before the tag field 1122.

In embodiments having the control byte, the control byte may be sub-divided into an element type field and a tag control field. In some embodiments, the element type field includes 5 lower bits of the control byte and the tag control field occupies the upper 3 bits. The element type field indicates the TLV element's type as well as the how the length field 1124 and value field 1126 are encoded. In certain embodiments, the element type field also encodes Boolean values and/or null values for the TLV. For example, an embodiment of an enumeration of element type field is provided in Table 1 below.

TABLE 1

Example element type field values.

| 7 | 6 | 5 | 4 | 3 | 2 | 1 | 0 | |
|---|---|---|---|---|---|---|---|---|
| | | | 0 | 0 | 0 | 0 | 0 | Signed Integer, 1 byte value |
| | | | 0 | 0 | 0 | 0 | 1 | Signed Integer, 2 byte value |
| | | | 0 | 0 | 0 | 1 | 0 | Signed Integer, 4 byte value |
| | | | 0 | 0 | 0 | 1 | 1 | Signed Integer, 8 byte value |
| | | | 0 | 0 | 1 | 0 | 0 | Unsigned Integer, 1 byte value |
| | | | 0 | 0 | 1 | 0 | 1 | Unsigned Integer, 2 byte value |
| | | | 0 | 0 | 1 | 1 | 0 | Unsigned Integer, 4 byte value |
| | | | 0 | 0 | 1 | 1 | 1 | Unsigned Integer, 8 byte value |
| | | | 0 | 1 | 0 | 0 | 0 | Boolean False |
| | | | 0 | 1 | 0 | 0 | 1 | Boolean True |
| | | | 0 | 1 | 0 | 1 | 0 | Floating Point Number, 4 byte value |
| | | | 0 | 1 | 0 | 1 | 1 | Floating Point Number, 8 byte value |
| | | | 0 | 1 | 1 | 0 | 0 | UTF8-String, 1 byte length |
| | | | 0 | 1 | 1 | 0 | 1 | UTF8-String, 2 byte length |
| | | | 0 | 1 | 1 | 1 | 0 | UTF8-String, 4 byte length |
| | | | 0 | 1 | 1 | 1 | 1 | UTF8-String, 8 byte length |
| | | | 1 | 0 | 0 | 0 | 0 | Byte String, 1 byte length |
| | | | 1 | 0 | 0 | 0 | 1 | Byte String, 2 byte length |
| | | | 1 | 0 | 0 | 1 | 0 | Byte String, 4 byte length |

TABLE 1-continued

Example element type field values.

| 7 | 6 | 5 | 4 | 3 | 2 | 1 | 0 | |
|---|---|---|---|---|---|---|---|---|
|   |   | 1 | 0 | 0 | 1 | 1 | Byte String, 8 byte length |
|   |   | 1 | 0 | 1 | 0 | 0 | Null |
|   |   | 1 | 0 | 1 | 0 | 1 | Dictionary |
|   |   | 1 | 0 | 1 | 1 | 0 | Array |
|   |   | 1 | 0 | 1 | 1 | 1 | Path |
|   |   | 1 | 1 | 0 | 0 | 0 | End of Container |

The tag control field indicates a form of the tag in the tag field 1122 assigned to the TLV element (including a zero-length tag). Examples, of tag control field values are provided in Table 2 below.

TABLE 2

Example values for tag control field.

| 7 | 6 | 5 | 4 | 3 | 2 | 1 | 0 | |
|---|---|---|---|---|---|---|---|---|
| 0 | 0 | 0 |   |   |   |   |   | Anonymous, 0 bytes |
| 0 | 0 | 1 |   |   |   |   |   | Context-specific Tag, 1 byte |
| 0 | 1 | 0 |   |   |   |   |   | Core Profile Tag, 2 bytes |
| 0 | 1 | 1 |   |   |   |   |   | Core Profile Tag, 4 bytes |
| 1 | 0 | 0 |   |   |   |   |   | Implicit Profile Tag, 2 bytes |
| 1 | 0 | 1 |   |   |   |   |   | Implicit Profile Tag, 4 bytes |
| 1 | 1 | 0 |   |   |   |   |   | Fully-qualified Tag, 6 bytes |
| 1 | 1 | 1 |   |   |   |   |   | Fully-qualified Tag, 8 bytes |

In other words, in embodiments having a control byte, the control byte may indicate a length of the tag.

In certain embodiments, the tag field 1122 may include zero to eight bytes, such as eight, sixteen, thirty two, or sixty four bits. In some embodiments, the tag of the tag field may be classified as profile-specific tags or context-specific tags. Profile-specific tags identify elements globally using a vendor Id, a profile Id, and/or tag number as discussed below. Context-specific tags identify TLV elements within a context of a containing dictionary element and may include a single-byte tag number. Since context-specific tags are defined in context of their containers, a single context-specific tag may have different interpretations when included in different containers. In some embodiments, the context may also be derived from nested containers.

In embodiments having the control byte, the tag length is encoded in the tag control field and the tag field 1122 includes a possible three fields: a vendor Id field, a profile Id field, and a tag number field. In the fully-qualified form, the encoded tag field 1122 includes all three fields with the tag number field including 16 or 32 bits determined by the tag control field. In the implicit form, the tag includes only the tag number, and the vendor Id and profile number are inferred from the protocol context of the TLV element. The core profile form includes profile-specific tags, as discussed above. Context-specific tags are encoded as a single byte conveying the tag number. Anonymous elements have zero-length tag fields 1122.

In some embodiments without a control byte, two bits may indicate a length of the tag field 1122, two bits may indicate a length of the length field 1124, and four bits may indicate a type of information stored in the value field 1126. An example of possible encoding for the upper 8 bits for the tag field is illustrated below in Table 3.

TABLE 3

Tag field of a TLV packet

| Byte 0 | | | | | | | | |
|---|---|---|---|---|---|---|---|---|
| 7 | 6 | 5 | 4 | 3 | 2 | 1 | 0 | Description |
| 0 | 0 | — | — | — | — | — | — | Tag is 8 bits |
| 0 | 1 | — | — | — | — | — | — | Tag is 16 bits |
| 1 | 0 | — | — | — | — | — | — | Tag is 32 bits |
| 1 | 1 | — | — | — | — | — | — | Tag is 64 bits |
| — | — | 0 | 0 | — | — | — | — | Length is 8 bits |
| — | — | 0 | 1 | — | — | — | — | Length is 16 bits |
| — | — | 1 | 0 | — | — | — | — | Length is 32 bits |
| — | — | 1 | 1 | — | — | — | — | Length is 64 bits |
| — | — | — | — | 0 | 0 | 0 | 0 | Boolean |
| — | — | — | — | 0 | 0 | 0 | 1 | Fixed 8-bit Unsigned |
| — | — | — | — | 0 | 0 | 1 | 0 | Fixed 8-bit Signed |
| — | — | — | — | 0 | 0 | 1 | 1 | Fixed 16-bit Unsigned |
| — | — | — | — | 0 | 1 | 0 | 0 | Fixed 16-bit Signed |
| — | — | — | — | 0 | 1 | 0 | 1 | Fixed 32-bit Unsigned |
| — | — | — | — | 0 | 1 | 1 | 0 | Fixed 32-bit Signed |
| — | — | — | — | 0 | 1 | 1 | 1 | Fixed 64-bit Unsigned |
| — | — | — | — | 1 | 0 | 0 | 0 | Fixed 64-bit Signed |
| — | — | — | — | 1 | 0 | 0 | 1 | 32-bit Floating Point |
| — | — | — | — | 1 | 0 | 1 | 0 | 64-bit Floating Point |
| — | — | — | — | 1 | 0 | 1 | 1 | UTF-8 String |
| — | — | — | — | 1 | 1 | 0 | 0 | Opaque Data |
| — | — | — | — | 1 | 1 | 0 | 1 | Container |

As illustrated in Table 3, the upper 8 bits of the tag field 1122 may be used to encode information about the tag field 1122, length field 1124, and the value field 1126, such that the tag field 112 may be used to determine length for the tag field 122 and the length fields 1124. Remaining bits in the tag field 1122 may be made available for user-allocated and/or user-assigned tag values.

The length field 1124 may include eight, sixteen, thirty two, or sixty four bits as indicated by the tag field 1122 as illustrated in Table 3 or the element field as illustrated in Table 2. Moreover, the length field 1124 may include an unsigned integer that represents a length of the encoded in the value field 1126. In some embodiments, the length may be selected by a device sending the TLV element. The value field 1126 includes the payload data to be decoded, but interpretation of the value field 1126 may depend upon the tag length fields, and/or control byte. For example, a TLV packet without a control byte including an 8 bit tag is illustrated in Table 4 below for illustration.

TABLE 4

Example of a TLV packet including an 8-bit tag

| Tag | Length | Value | Description |
|---|---|---|---|
| 0x0d | 0x24 | | |
| 0x09 | 0x04 | 0x42 95 00 00 | 74.5 |
| 0x09 | 0x04 | 0x42 98 66 66 | 76.2 |
| 0x09 | 0x04 | 0x42 94 99 9a | 74.3 |
| 0x09 | 0x04 | 0x42 98 99 9a | 76.3 |
| 0x09 | 0x04 | 0x42 95 33 33 | 74.6 |
| 0x09 | 0x04 | 0x42 98 33 33 | 76.1 |

As illustrated in Table 4, the first line indicates that the tag field 1122 and the length field 1124 each have a length of 8 bits. Additionally, the tag field 1122 indicates that the tag type is for the first line is a container (e.g., the TLV packet). The tag field 1124 for lines two through six indicate that each entry in the TLV packet has a tag field 1122 and length field 1124 consisting of 8 bits each. Additionally, the tag field 1124 indicates that each entry in the TLV packet has a value field 1126 that includes a 32-bit floating point. Each entry in the value field 1126 corresponds to a floating number that may be decoded using the corresponding tag field 1122 and length field 1124 information. As illustrated in this example, each entry in the value field 1126 corresponds to a temperature in Fahrenheit. As can be understood, by storing data in a TLV packet as described above, data may be transferred compactly while remaining flexible for varying lengths and information as may be used by different devices in the fabric. Moreover, in some embodiments, multi-byte integer fields may be transmitted in little-endian order or big-endian order.

By transmitting TLV packets in using an order protocol (e.g., little-endian) that may be used by sending/receiving device formats (e.g., JSON), data transferred between nodes may be transmitted in the order protocol used by at least one of the nodes (e.g., little endian). For example, if one or more nodes include ARM or ix86 processors, transmissions between the nodes may be transmitted using little-endian byte ordering to reduce the use of byte reordering. By reducing the inclusion of byte reordering, the TLV format enable devices to communicate using less power than a transmission that uses byte reordering on both ends of the transmission. Furthermore, TLV formatting may be specified to provide a one-to-one translation between other data storage techniques, such as JSON+ Extensible Markup Language (XML). As an example, the TLV format may be used to represent the following XML Property List:

```
<?xml version="1.0" encoding="UTF-8"?>
<!DOCTYPE plist PUBLIC "-//Apple Computer//DTD PLIST 1.0//EN"
"http://www.apple.com/DTDs/PropertyList-1.0.dtd">
<plist version="1.0">
<dict>
  <key>OfflineMode</key>
  <false/>
  <key>Network</key>
  <dict>
    <key>IPv4</key>
    <dict>
      <key>Method</key>
      <string>dhcp</string>
    </dict>
    <key>IPv6</key>
    <dict>
      <key>Method</key>
      <string>auto</string>
    </dict>
  </dict>
  <key>Technologies</key>
  <dict>
    <key>wifi</key>
    <dict>
      <key>Enabled</key>
      <true/>
      <key>Devices</key>
      <dict>
        <key>wifi__18b4300008b027</key>
        <dict>
          <key>Enabled</key>
          <true/>
        </dict>
      </dict>
      <key>Services</key>
      <array>
        <string>wifi__18b4300008b027__3939382d33204
        16c70696e652054657 272616365</string>
      </array>
    </dict>
    <key>802.15.4</key>
    <dict>
      <key>Enabled</key>
      <true/>
      <key>Devices</key>
      <dict>
        <key>802.15.4__18b43000000002fac4</key>
        <dict>
          <key>Enabled</key>
          <true/>
        </dict>
      </dict>
      <key>Services</key>
      <array>
        <string>802.15.4__18b43000000002fac4__3
        939382d3320416c70696e6520546572</string>
      </array>
    </dict>
  </dict>
  <key>Services</key>
  <dict>
    <key>wifi__18b4300008b027__3939382d3320416c70696e6520546572
    72616365</key>
    <dict>
      <key>Name</key>
      <string>998-3 Alpine Terrace</string>
      <key>SSID</key>
      <data>3939382d3320416c70696e6652054657272616365</data>
      <key>Frequency</key>
      <integer>2462</integer>
      <key>AutoConnect</key>
      <true/>
      <key>Favorite</key>
      <true/>
      <key>Error</key>
      <string/>
      <key>Network</key>
      <dict>
        <key>IPv4</key>
        <dict>
          <key>DHCP</key>
          <dict>
            <key>LastAddress</key>
            <data>0a02001e</data>
          </dict>
        </dict>
        <key>IPv6</key>
        <dict/>
      </dict>
    </dict>
    <key>802.15.4__18b43000000002fac4__3939382d3320416c70696e
    6520546572</key>
    <dict>
      <key>Name</key>
      <string>998-3 Alpine Ter</string>
      <key>EPANID</key>
      <data>3939382d3320416c70696e6520546572</data>
      <key>Frequency</key>
      <integer>2412</integer>
      <key>AutoConnect</key>
      <true/>
      <key>Favorite</key>
      <true/>
      <key>Error</key>
      <string/>
      <key>Network</key>
      <dict/>
    </dict>
  </dict>
</dict>
</plist>
```

As an example, the above property list may be represented in tags of the above described TLV format (without a control byte) according to Table 5 below.

TABLE 5

Example representation of the XML Property List in TLV format

| XML Key | Tag Type | Tag Number |
|---|---|---|
| OfflineMode | Boolean | 1 |
| IPv4 | Container | 3 |
| IPv6 | Container | 4 |
| Method | String | 5 |
| Technologies | Container | 6 |
| WiFi | Container | 7 |
| 802.15.4 | Container | 8 |
| Enabled | Boolean | 9 |
| Devices | Container | 10 |
| ID | String | 11 |
| Services | Container | 12 |
| Name | String | 13 |
| SSID | Data | 14 |
| EPANID | Data | 15 |
| Frequency | 16-bit Unsigned | 16 |
| AutoConnect | Boolean | 17 |
| Favorite | Boolean | 18 |
| Error | String | 19 |
| DHCP | String | 20 |
| LastAddress | Data | 21 |
| Device | Container | 22 |
| Service | Container | 23 |

Similarly, Table 6 illustrates an example of literal tag, length, and value representations for the example XML Property List.

TABLE 6

Example of literal values for tag, length, and value fields for XML Property List

| Tag | Length | Value | Description |
|---|---|---|---|
| 0x40 01 | 0x01 | 0 | OfflineMode |
| 0x4d 02 | 0x14 | | Network |
| 0x4d 03 | 0x07 | | Network.IPv4 |
| 0x4b 05 | 0x04 | "dhcp" | Network.IPv4.Method |
| 0x4d 04 | 0x07 | | Network.IPv6 |
| 0x4b 05 | 0x04 | "auto" | Network.IPv6.Method |
| 0x4d 06 | 0xd6 | | Technologies |
| 0x4d 07 | 0x65 | | Technologies.wifi |
| 0x40 09 | 0x01 | 1 | Technologies.wifi.Enabled |
| 0x4d 0a | 0x5e | | Technologies.wifi.Devices |
| 0x4d 16 | 0x5b | | Technologies.wifi.Devices.Device.[0] |
| 0x4b 0b | 0x13 | "wifi_18b43 ... " | Technologies.wifi.Devices.Device.[0].ID |
| 0x40 09 | 0x01 | 1 | Technologies.wifi.Devices.Device.[0].Enabled |
| 0x4d 0c | 0x3e | | Technologies.wifi.Devices.Device.[0].Services |
| 0x0b | 0x 3c | "wifi_18b43 ... " | Technologies.wifi.Devices.Device.[0].Services.[0] |
| 0x4d 08 | 0x6b | | Technologies.802.15.4 |
| 0x40 09 | 0x01 | 1 | Technologies.802.15.4.Enabled |
| 0x4d 0a | 0x64 | | Technologies.802.15.4.Devices |
| 0x4d 16 | 0x61 | | Technologies.802.15.4.Devices.Device.[0] |
| 0x4b 0b | 0x1a | "802.15.4_18 ... " | Technologies.802.15.4.Devices.Device.[0].ID |
| 0x40 09 | 0x01 | 1 | Technologies.802.15.4.Devices.Device.[0].Enabled |
| 0x4d 0c | 0x3d | | Technologies.802.15.4.Devices.Device.[0].Services |
| 0x0b | 0x 3b | "802.15.4_18 ... " | Technologies.802.15.4.Devices.Device.[0].Services.[0] |
| 0x4d 0c | 0xcb | | Services |
| 0x4d 17 | 0x75 | | Services.Service.[0] |
| 0x4b 0b | 0x13 | "wifi_18b43 ... " | Services.Service.[0].ID |
| 0x4b 0d | 0x14 | "998-3 Alp..." | Services.Service.[0].Name |
| 0x4c 0f | 0x28 | 3939382d ... | Services.Service.[0].SSID |
| 0x45 10 | 0x02 | 2462 | Services.Service.[0].Frequency |
| 0x40 11 | 0x01 | 1 | Services.Service.[0].AutoConnect |
| 0x40 12 | 0x01 | 1 | Services.Service.[0].Favorite |
| 0x4d 02 | 0x0d | | Services.Service.[0].Network |
| 0x4d 03 | 0x0a | | Services.Service.[0].Network.IPv4 |
| 0x4d 14 | 0x07 | | Services.Service.[0].Network.IPv4.DHCP |
| 0x45 15 | 0x04 | 0x 0a02001e | Services.Service.[0].Network.IPv4.LastAddress |
| 0x4d 17 | 0x50 | | Services.Service.[1] |
| 0x4b 0b | 0x1a | "802.15.4_18 ... " | Services.Service.[1].ID |
| 0x4c 0d | 0x10 | "998-3 Alp ... " | Services.Service.[1].Name |
| 0x4c 0f | 0x10 | 3939382d ... | Services.Service.[1].EPANID |
| 0x45 10 | 0x02 | 2412 | Services.Service.[1].Frequency |
| 0x40 11 | 0x01 | 1 | Services.Service.[1].AutoConnect |
| 0x40 12 | 0x01 | 1 | Services.Service.[1].Favorite |

The TLV format enables reference of properties that may also be enumerated with XML, but does so with a smaller storage size. For example, Table 7 illustrates a comparison of data sizes of the XML Property List, a corresponding binary property list, and the TLV format.

TABLE 7

Comparison of the sizes of property list data sizes.

| List Type | Size in Bytes | Percentage of XML Size |
|---|---|---|
| XML | 2,199 | — |
| Binary | 730 | −66.8% |
| TLV | 450 | −79.5% |

By reducing the amount of data used to transfer data, the TLV format enables the fabric 1000 transfer data to and/or from devices having short duty cycles due to limited power (e.g., battery supplied devices). In other words, the TLV format allows flexibility of transmission while increasing compactness of the data to be transmitted.

C. General Message Protocol

Figure 12:
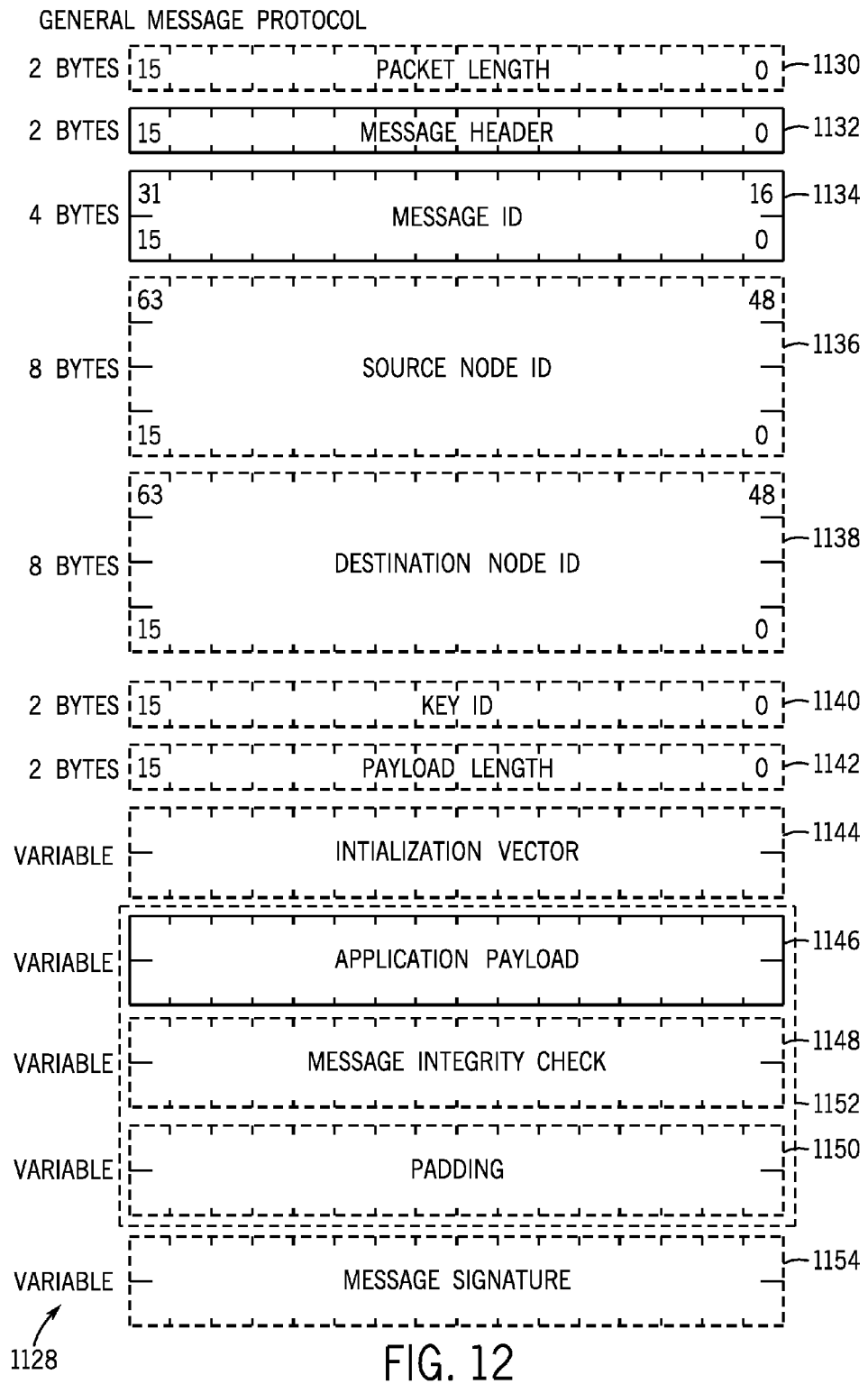
FIG. 12 illustrates a general message protocol (GMP) that may be used to transmit data over the fabric network that may include the TLV packet of FIG. 11, in accordance with an embodiment.

In addition to sending particular entries of varying sizes, data may be transmitted within the fabric using a general message protocol that may incorporate TLV formatting. An embodiment of a general message protocol (GMP) 1128 is illustrated in FIG. 12. In certain embodiments, the general message protocol (GMP) 1128 may be used to transmit data within the fabric. The GMP 1128 may be used to transmit data via connectionless protocols (e.g., UDP) and/or connection-oriented protocols (e.g., TCP). Accordingly, the GMP 1128 may flexibly accommodate information that is used in one protocol while ignoring such information when using another protocol. Moreover, the GMP 1226 may enable omission of fields that are not used in a specific transmission. Data that may be omitted from one or more GMP 1226 transfers is generally indicated using grey borders around the data units. In some embodiments, the multi-byte integer fields may be transmitted in a little-endian order or a big-endian order.

i. Packet Length

In some embodiments, the GMP 1128 may include a Packet Length field 1130. In some embodiments, the Packet Length field 1130 includes 2 bytes. A value in the Packet Length field 1130 corresponds to an unsigned integer indicating an overall length of the message in bytes, excluding the Packet Length field 1130 itself. The Packet Length field 1130 may be present when the GMP 1128 is transmitted over a TCP connection, but when the GMP 1128 is transmitted over a UDP connection, the message length may be equal to the payload length of the underlying UDP packet obviating the Packet Length field 1130.

ii. Message Header

Figure 13:
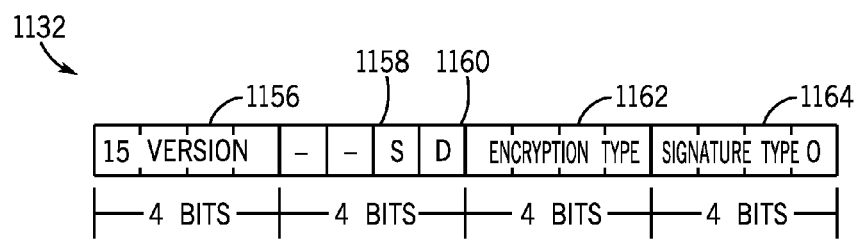
FIG. 13 illustrates a message header field of the GMP of FIG. 12, in accordance with an embodiment.

The GMP 1128 may also include a Message Header 1132 regardless of whether the GMP 1128 is transmitted using TCP or UDP connections. In some embodiments, the Message Header 1132 includes two bytes of data arranged in the format illustrated in FIG. 13. As illustrated in FIG. 13, the Message Header 1132 includes a Version field 1156. The Version field 1156 corresponds to a version of the GMP 1128 that is used to encode the message. Accordingly, as the GMP 1128 is updated, new versions of the GMP 1128 may be created, but each device in a fabric may be able to receive a data packet in any version of GMP 1128 known to the device. In addition to the Version field 1156, the Message Header 1132 may include an S Flag field 1158 and a D Flag 1160. The S Flag 1158 is a single bit that indicates whether a Source Node Id (discussed below) field is included in the transmitted packet. Similarly, the D Flag 1160 is a single bit that indicates whether a Destination Node Id (discussed below) field is included in the transmitted packet.

The Message Header 1132 also includes an Encryption Type field 1162. The Encryption Type field 1162 includes four bits that specify which type of encryption/integrity checking applied to the message, if any. For example, 0x0 may indicate that no encryption or message integrity checking is included, but a decimal 0x1 may indicate that AES-128-CTR encryption with HMAC-SHA-1 message integrity checking is included.

Finally, the Message Header 1132 further includes a Signature Type field 1164. The Signature Type field 1164 includes four bits that specify which type of digital signature is applied to the message, if any. For example, 0x0 may indicate that no digital signature is included in the message, but 0x1 may indicate that the Elliptical Curve Digital Signature Algorithm (ECDSA) with Prime256v1 elliptical curve parameters is included in the message.

iii. Message Id

Returning to FIG. 12, the GMP 1128 also includes a Message Id field 1134 that may be included in a transmitted message regardless of whether the message is sent using TCP or UDP. The Message Id field 1134 includes four bytes that correspond to an unsigned integer value that uniquely identifies the message from the perspective of the sending node. In some embodiments, nodes may assign increasing Message Id 1134 values to each message that they send returning to zero after reaching $2^{32}$ messages.

iv. Source Node Id

In certain embodiments, the GMP 1128 may also include a Source Node Id field 1136 that includes eight bytes. As discussed above, the Source Node Id field 1136 may be present in a message when the single-bit S Flag 1158 in the Message Header 1132 is set to 1. In some embodiments, the Source Node Id field 1136 may contain the Interface ID 1104 of the ULA 1098 or the entire ULA 1098. In some embodiments, the bytes of the Source Node Id field 1136 are transmitted in an ascending index-value order (e.g., EUI[0] then EUI[1] then EUI[2] then EUI[3], etc.).

v. Destination Node Id

The GMP 1128 may include a Destination Node Id field 1138 that includes eight bytes. The Destination Node Id field 1138 is similar to the Source Node Id field 1136, but the Destination Node Id field 1138 corresponds to a destination node for the message. The Destination Node Id field 1138 may be present in a message when the single-bit D Flag 1160 in the Message Header 1132 is set to 1. Also similar to the Source Node Id field 1136, in some embodiments, bytes of the Destination Node Id field 1138 may be transmitted in an ascending index-value order (e.g., EUI[0] then EUI[1] then EUI[2] then EUI[3], etc.).

vi. Key Id

In some embodiments, the GMP 1128 may include a Key Id field 1140. In certain embodiments, the Key Id field 1140 includes two bytes. The Key Id field 1140 includes an unsigned integer value that identifies the encryption/message integrity keys used to encrypt the message. The presence of the Key Id field 1140 may be determined by the value of Encryption Type field 1162 of the Message Header 1132. For example, in some embodiments, when the value for the Encryption Type field 1162 of the Message Header 1132 is 0x0, the Key Id field 1140 may be omitted from the message.

Figure 14:
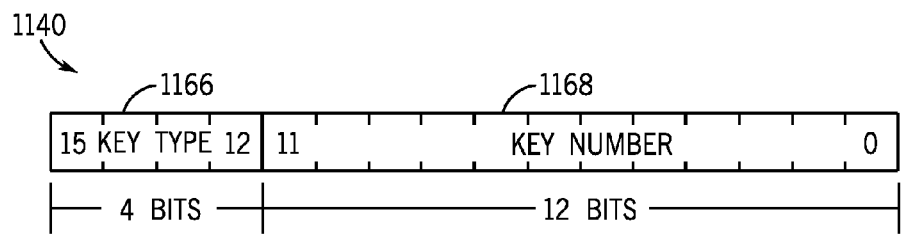
FIG. 14 illustrates a key identifier field of the GMP of FIG. 12, in accordance with an embodiment.

An embodiment of the Key Id field 1140 is presented in FIG. 14. In the illustrated embodiment, the Key Id field 1140 includes a Key Type field 1166 and a Key Number field 1168. In some embodiments, the Key Type field 1166 includes four bits. The Key Type field 1166 corresponds to an unsigned integer value that identifies a type of encryption/message integrity used to encrypt the message. For example, in some embodiments, if the Key Type field 1166 is 0x0, the fabric key is shared by all or most of the nodes in the fabric. However, if the Key Type field 1166 is 0x1, the fabric key is shared by a pair of nodes in the fabric.

The Key Id field 1140 also includes a Key Number field 1168 that includes twelve bits that correspond to an unsigned integer value that identifies a particular key used to encrypt the message out of a set of available keys, either shared or fabric keys.

vii. Payload Length

In some embodiments, the GMP 1128 may include a Payload Length field 1142. The Payload Length field 1142, when present, may include two bytes. The Payload Length field 1142 corresponds to an unsigned integer value that indicates a size in bytes of the Application Payload field. The Payload Length field 1142 may be present when the message is encrypted using an algorithm that uses message padding, as described below in relation to the Padding field.

viii. Initialization Vector

In some embodiments, the GMP 1128 may also include an Initialization Vector (IV) field 1144. The IV field 1144, when present, includes a variable number of bytes of data. The IV field 1144 contains cryptographic IV values used to encrypt the message. The IV field 1144 may be used when the message is encrypted with an algorithm that uses an IV. The length of the IV field 1144 may be derived by the type of encryption used to encrypt the message.

ix. Application Payload

The GMP 1128 includes an Application Payload field 1146. The Application Payload field 1146 includes a variable number of bytes. The Application Payload field 1146 includes application data conveyed in the message. The length of the Application Payload field 1146 may be determined from the Payload Length field 1142, when present. If the Payload Length field 1142 is not present, the length of the Application Payload field 1146 may be determined by subtracting the length of all other fields from the overall length of the message and/or data values included within the Application Payload 1146 (e.g., TLV).

Figure 15:
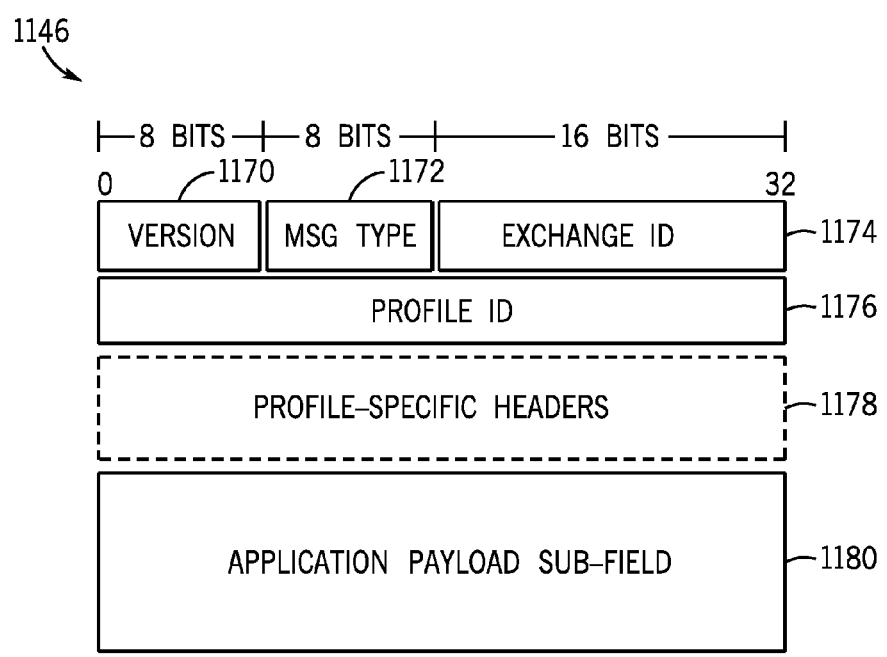
FIG. 15 illustrates an application payload field of the GMP of FIG. 12, in accordance with an embodiment.

An embodiment of the Application Payload field 1146 is illustrated in FIG. 15. The Application Payload field 1146 includes an APVersion field 1170. In some embodiments, the APVersion field 1170 includes eight bits that indicate what version of fabric software is supported by the sending device. The Application Payload field 1146 also includes a Message Type field 1172. The Message Type field 1172 may include eight bits that correspond to a message operation code that indicates the type of message being sent within a profile. For example, in a software update profile, a 0x00 may indicate that the message being sent is an image announce. The Application Payload field 1146 further includes an Exchange Id field 1174 that includes sixteen bits that corresponds to an exchange identifier that is unique to the sending node for the transaction.

In addition, the Application Payload field 1146 includes a Profile Id field 1176. The Profile Id 1176 indicates a "theme of discussion" used to indicate what type of communication occurs in the message. The Profile Id 1176 may correspond to one or more profiles that a device may be capable of communicating. For example, the Profile Id 1176 may indicate that the message relates to a core profile, a software update profile, a status update profile, a data management profile, a climate and comfort profile, a security profile, a safety profile, and/or other suitable profile types. Each device on the fabric may include a list of profiles which are relevant to the device and in which the device is capable of "participating in the discussion." For example, many devices in a fabric may include the core profile, the software update profile, the status update profile, and the data management profile, but only some devices would include the climate and comfort profile. The APVersion field 1170, Message Type field 1172, the Exchange Id field, the Profile Id field 1176, and the Profile-Specific Header field 1176, if present, may be referred to in combination as the "Application Header."

In some embodiments, an indication of the Profile Id via the Profile Id field 1176 may provide sufficient information to provide a schema for data transmitted for the profile. However, in some embodiments, additional information may be used to determine further guidance for decoding the Application Payload field 1146. In such embodiments, the Application Payload field 1146 may include a Profile-Specific Header field 1178. Some profiles may not use the Profile-Specific Header field 1178 thereby enabling the Application Payload field 1146 to omit the Profile-Specific Header field 1178. Upon determination of a schema from the Profile Id field 1176 and/or the Profile-Specific Header field 1178, data may be encoded/decoded in the Application Payload sub-field 1180. The Application Payload sub-field 1180 includes the core application data to be transmitted between devices and/or services to be stored, rebroadcast, and/or acted upon by the receiving device/service.

x. Message Integrity Check

Returning to FIG. 12, in some embodiments, the GMP 1128 may also include a Message Integrity Check (MIC) field 1148. The MIC field 1148, when present, includes a variable length of bytes of data containing a MIC for the message. The length and byte order of the field depends upon the integrity check algorithm in use. For example, if the message is checked for message integrity using HMAC-SHA-1, the MIC field 1148 includes twenty bytes in big-endian order. Furthermore, the presence of the MIC field 1148 may be determined by whether the Encryption Type field 1162 of the Message Header 1132 includes any value other than 0x0.

xi. Padding

The GMP 1128 may also include a Padding field 1150. The Padding field 1150, when present, includes a sequence of bytes representing a cryptographic padding added to the message to make the encrypted portion of the message evenly divisible by the encryption block size. The presence of the Padding field 1150 may be determined by whether the type of encryption algorithm (e.g., block ciphers in cipher-block chaining mode) indicated by the Encryption Type field 1162 in the Message Header 1132 uses cryptographic padding.

xii. Encryption

The Application Payload field 1146, the MIC field 1148, and the Padding field 1150 together form an Encryption block 1152. The Encryption block 1152 includes the portions of the message that are encrypted when the Encryption Type field 1162 in the Message Header 1132 is any value other than 0x0.

xiii. Message Signature

The GMP 1128 may also include a Message Signature field 1154. The Message Signature field 1154, when present, includes a sequence of bytes of variable length that contains a cryptographic signature of the message. The length and the contents of the Message Signature field may be determined according to the type of signature algorithm in use and indicated by the Signature Type field 1164 of the Message Header 1132. For example, if ECDSA using the Prime256v1 elliptical curve parameters is the algorithm in use, the Message Signature field 1154 may include two thirty-two bit integers encoded in little-endian order.

IV. Profiles and Protocols

As discussed above, one or more schemas of information may be selected upon desired general discussion type for the message. A profile may consist of one or more schemas. For example, one set of schemas of information may be used to encode/decode data in the Application Payload sub-field 1180 when one profile is indicated in the Profile Id field 1176 of the Application Payload 1146. However, a different set of schemas may be used to encode/decode data in the Application Payload sub-field 1180 when a different profile is indicated in the Profile Id field 1176 of the Application Payload 1146.

Additionally, in certain embodiments, each device may include a set of methods used to process profiles. For example, a core protocol may include the following profiles: GetProfiles, GetSchema, GetSchemas, GetProperty, GetProperties, SetProperty, SetProperties, RemoveProperty, RemoveProperties, RequestEcho, NotifyPropertyChanged, and/or NotifyPropertiesChanged. The Get Profiles method may return an array of profiles supported by a queried node. The GetSchema and GetSchemas methods may respectively return one or all schemas for a specific profile. GetProperty and GetProperties may respectively return a value or all value pairs for a profile schema. SetProperty and SetProperties may respectively set single or multiple values for a profile schema. RemoveProperty and RemoveProperties may respectively attempt to remove a single or multiple values from a profile schema. RequestEcho may send an arbitrary data payload to a specified node which the node returns unmodified. NotifyPropertyChange and NotifyPropertiesChanged may respectively issue a notification if a single/multiple value pairs have changed for a profile schema.

To aid in understanding profiles and schemas, a non-exclusive list of profiles and schemas are provided below for illustrative purposes.

A. Status Reporting

Figure 16:
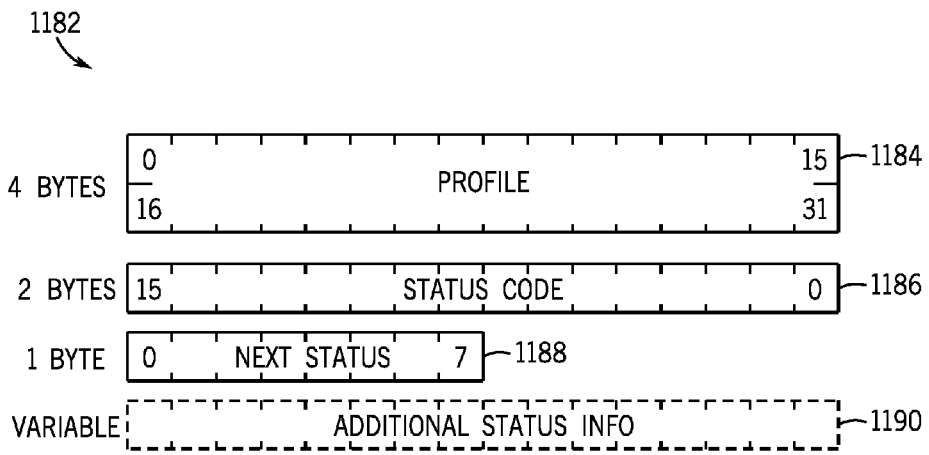
FIG. 16 illustrates a status reporting schema that may be used to update status information in the fabric network, in accordance with an embodiment.

A status reporting schema is presented as the status reporting frame 1182 in FIG. 16. The status reporting schema may be a separate profile or may be included in one or more profiles (e.g., a core profile). In certain embodiments, the status reporting frame 1182 includes a profile field 1184, a status code field 1186, a next status field 1188, and may include an additional status info field 1190.

i. Profile Field

Figure 17:
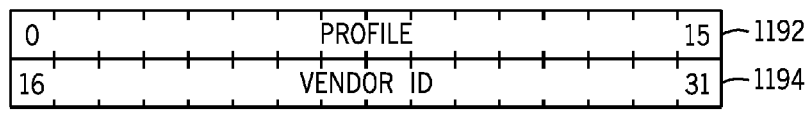
FIG. 17 illustrates a profile field of the status reporting schema of FIG. 16, in accordance with an embodiment.

In some embodiments, the profile field 1184 includes four bytes of data that defines the profile under which the information in the present status report is to be interpreted. An embodiment of the profile field 1184 is illustrated in FIG. 17 with two sub-fields. In the illustrated embodiment, the profile field 1184 includes a profile Id sub-field 1192 that includes sixteen bits that corresponds to a vendor-specific identifier for the profile under which the value of the status code field 1186 is defined. The profile field 1184 may also includes a vendor Id sub-field 1194 that includes sixteen bits that identifies a vendor providing the profile identified in the profile Id sub-field 1192.

ii. Status Code

In certain embodiments, the status code field 1186 includes sixteen bits that encode the status that is being reported. The values in the status code field 1186 are interpreted in relation to values encoded in the vendor Id sub-field 1192 and the profile Id sub-field 1194 provided in the profile field 1184. Additionally, in some embodiments, the status code space may be divided into four groups, as indicated in Table 8 below.

TABLE 8

Status Code Range Table

| Range | Name | Description |
|---|---|---|
| 0x0000 ... 0x0010 | success | A request was successfully processed. |
| 0x0011 ... 0x0020 | client error | An error has or may have occurred on the client-side of a client/server exchange. For example, the client has made a badly-formed request. |
| 0x0021 ... 0x0030 | server error | An error has or may have occurred on the server side of a client/server exchange. For example, the server has failed to process a client request to an operating system error. |
| 0x0031 ... 0x0040 | continue/redirect | Additional processing will be used, such as redirection, to complete a particular exchange, but no errors yet. |

Although Table 8 identifies general status code ranges that may be used separately assigned and used for each specific profile Id, in some embodiments, some status codes may be common to each of the profiles. For example, these profiles may be identified using a common profile (e.g., core profile) identifier, such as 0x00000000.

iii. Next Status

In some embodiments, the next status code field 1188 includes eight bits. The next status code field 1188 indicates whether there is following status information after the currently reported status. If following status information is to be included, the next status code field 1188 indicates what type of status information is to be included. In some embodiments, the next status code field 1188 may always be included, thereby potentially increasing the size of the message. However, by providing an opportunity to chain status information together, the potential for overall reduction of data sent may be reduced. If the next status field 1186 is 0x00, no following status information field 1190 is included. However, non-zero values may indicate that data may be included and indicate the form in which the data is included (e.g., in a TLV packet).

iv. Additional Status Info

When the next status code field 1188 is non-zero, the additional status info field 1190 is included in the message. If present, the status item field may contain status in a form that may be determined by the value of the preceding status type field (e.g., TLV format)

B. Software Update

The software update profile or protocol is a set of schemas and a client/server protocol that enables clients to be made aware of or seek information about the presence of software that they may download and install. Using the software update protocol, a software image may be provided to the profile client in a format known to the client. The subsequent processing of the software image may be generic, device-specific, or vendor-specific and determined by the software update protocol and the devices.

i. General Application Headers for the Application Payload

In order to be recognized and handled properly, software update profile frames may be identified within the Application Payload field 1146 of the GMP 1128. In some embodiments, all software update profile frames may use a common Profile Id 1176, such as 0x0000000C. Additionally, software update profile frames may include a Message Type field 1172 that indicates additional information and may chosen according to Table 9 below and the type of message being sent.

TABLE 9

Software update profile message types

| Type | Message |
| --- | --- |
| 0x00 | image announce |
| 0x01 | image query |
| 0x02 | image query response |
| 0x03 | download notify |
| 0x04 | notify response |
| 0x05 | update notify |
| 0x06 . . . 0xff | reserved |

Additionally, as described below, the software update sequence may be initiated by a server sending the update as an image announce or a client receiving the update as an image query. In either embodiment, an Exchange Id 1174 from the initiating event is used for all messages used in relation to the software update.

ii. Protocol Sequence

Figure 18:
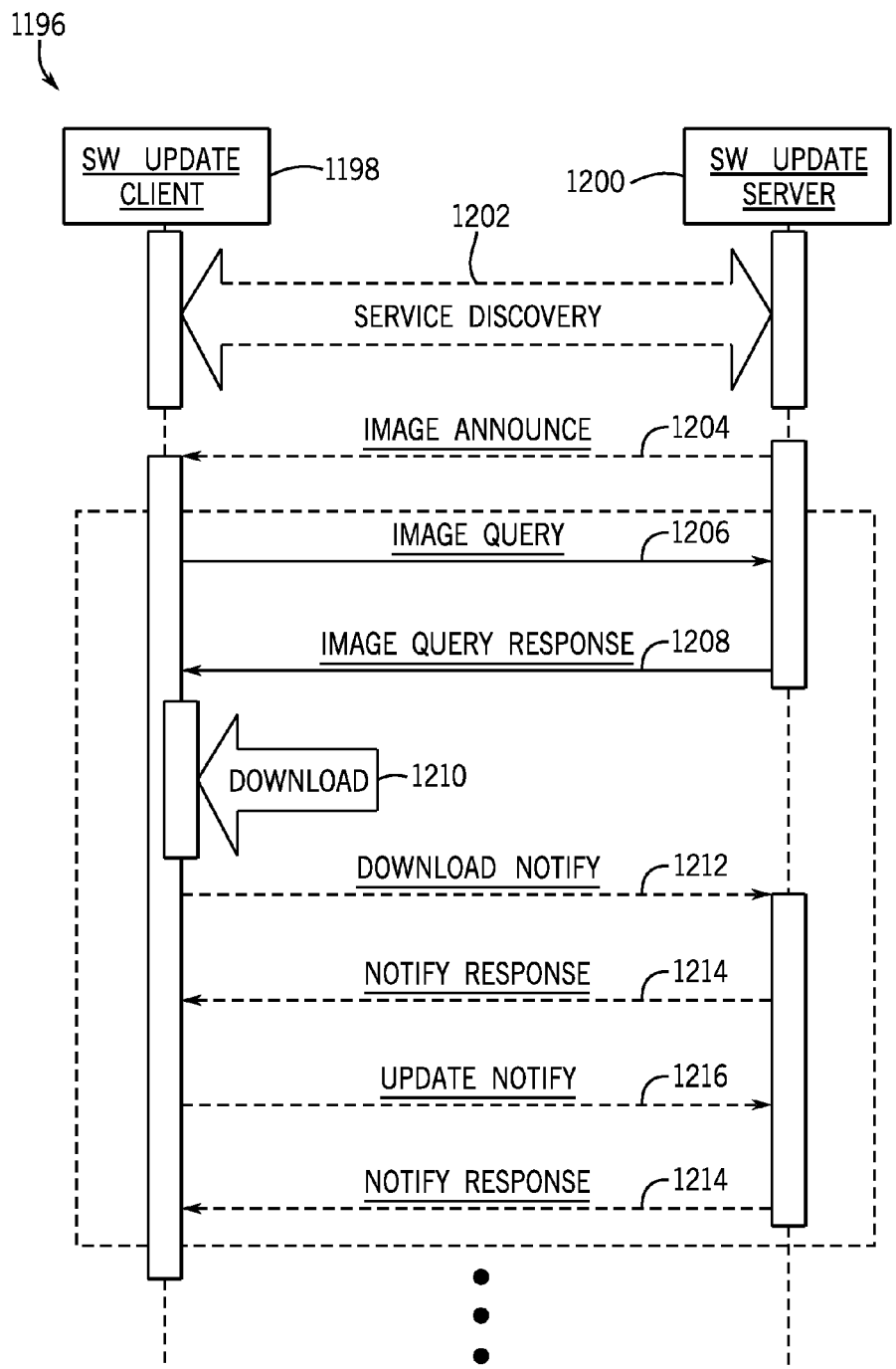
FIG. 18 illustrates a protocol sequence that may be used to perform a software update between a client and a server, in accordance with an embodiment.

FIG. 18 illustrates an embodiment of a protocol sequence 1196 for a software update between a software update client 1198 and a software update server 1200. In certain embodiments, any device in the fabric may be the software update client 1198 or the software update server 1200. Certain embodiments of the protocol sequence 1196 may include additional steps, such as those illustrated as dashed lines that may be omitted in some software update transmissions.

1. Service Discovery

In some embodiments, the protocol sequence 1196 begins with a software update profile server announcing a presence of the update. However, in other embodiments, such as the illustrated embodiment, the protocol sequence 1196 begins with a service discovery 1202, as discussed above.

2. Image Announce

In some embodiments, an image announce message 1204 may be multicast or unicast by the software update server 1200. The image announce message 1204 informs devices in the fabric that the server 1200 has a software update to offer. If the update is applicable to the client 1198, upon receipt of the image announce message 1204, the software update client 1198 responds with an image query message 1206. In certain embodiments, the image announce message 1204 may not be included in the protocol sequence 1196. Instead, in such embodiments, the software update client 1198 may use a polling schedule to determine when to send the image query message 1206.

3. Image Query

Figure 19:
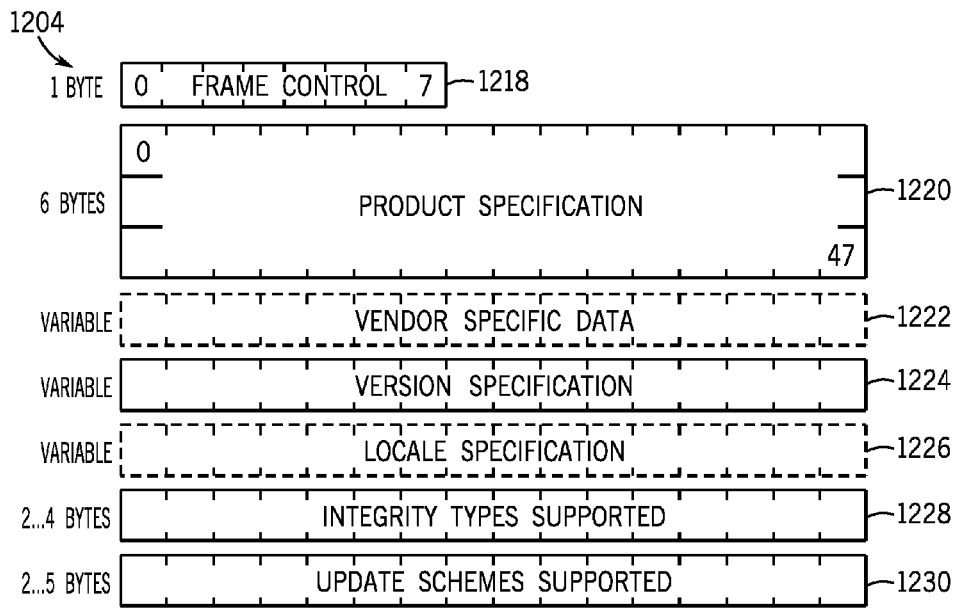
FIG. 19 illustrates an image query frame that may be used in the protocol sequence of FIG. 18, in accordance with an embodiment.

In certain embodiments, the image query message 1206 may be unicast from the software update client 1198 either in response to an image announce message 1204 or according to a polling schedule, as discussed above. The image query message 1206 includes information from the client 1198 about itself. An embodiment of a frame of the image query message 1206 is illustrated in FIG. 19. As illustrated in FIG. 19, certain embodiments of the image query message 1206 may include a frame control field 1218, a product specification field 1220, a vendor specific data field 1222, a version specification field 1224, a locale specification field 1226, an integrity type supported field 1228, and an update schemes supported field 1230.

a. Frame Control

Figure 20:
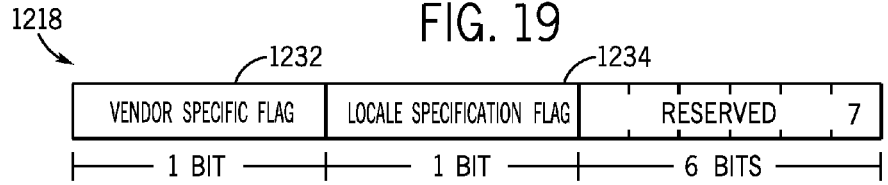
FIG. 20 illustrates a frame control field of the image query frame of FIG. 19, in accordance with an embodiment.

The frame control field 1218 includes 1 byte and indicates various information about the image query message 1204. An example of the frame control field 128 is illustrated in FIG. 20. As illustrated, the frame control field 1218 may include three sub-fields: vendor specific flag 1232, locale specification flag 1234, and a reserved field S3. The vendor specific flag 1232 indicates whether the vendor specific data field 1222 is included in the message image query message. For example, when the vendor specific flag 1232 is 0 no vendor specific data field 1222 may be present in the image query message, but when the vendor specific flag 1232 is 1 the vendor specific data field 1222 may be present in the image query message. Similarly, a 1 value in the locale specification flag 1234 indicates that a locale specification field 1226 is present in the image query message, and a 0 value indicates that the locale specification field 1226 in not present in the image query message.

b. Product Specification

Figure 21:
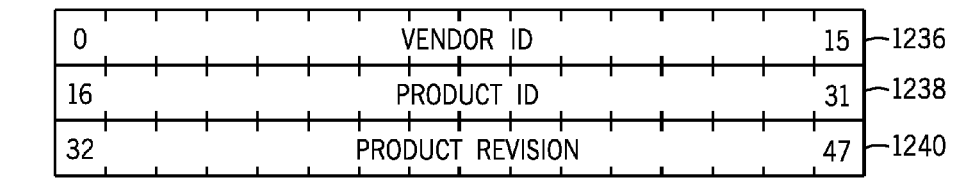
FIG. 21 illustrates a product specification field of the image query frame of FIG. 19, in accordance with an embodiment.

The product specification field 1220 is a six byte field. An embodiment of the product specification field 1220 is illustrated in FIG. 21. As illustrated, the product specification field 1220 may include three sub-fields: a vendor Id field 1236, a product Id field 1238, and a product revision field 1240. The vendor Id field 1236 includes sixteen bits that indicate a vendor for the software update client 1198. The product Id field 1238 includes sixteen bits that indicate the device product that is sending the image query message 1206 as the software update client 1198. The product revision field 1240 includes sixteen bits that indicate a revision attribute of the software update client 1198.

c. Vendor Specific Data

The vendor specific data field 1222, when present in the image query message 1206, has a length of a variable number of bytes. The presence of the vendor specific data field 1222 may be determined from the vendor specific flag 1232 of the frame control field 1218. When present, the vendor specific data field 1222 encodes vendor specific information about the software update client 1198 in a TLV format, as described above.

d. Version Specification

Figure 22:
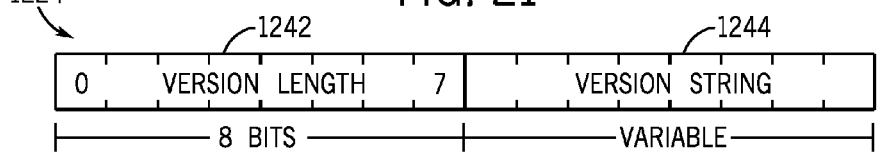
FIG. 22 illustrates a version specification field of the image query frame of FIG. 19, in accordance with an embodiment.

An embodiment of the version specification field 1224 is illustrated in FIG. 22. The version specification field 1224 includes a variable number of bytes sub-divided into two sub-fields: a version length field 1242 and a version string field 1244. The version length field 1242 includes eight bits that indicate a length of the version string field 1244. The version string field 1244 is variable in length and determined by the version length field 1242. In some embodiments, the version string field 1244 may be capped at 255 UTF-8 characters in length. The value encoded in the version string field 1244 indicates a software version attribute for the software update client 1198.

e. Locale Specification

Figure 23:
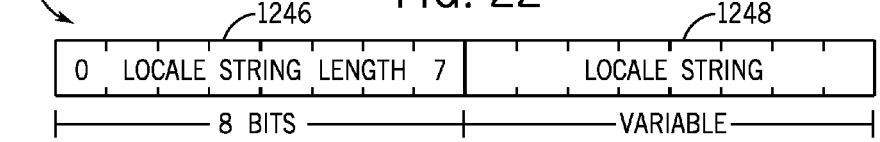
FIG. 23 illustrates a locale specification field of the image query frame of FIG. 19, in accordance with an embodiment.

In certain embodiments, the locale specification field 1226 may be included in the image query message 1206 when the locale specification flag 1234 of the frame control 1218 is 1. An embodiment of the locale specification field 1226 is illustrated in FIG. 23. The illustrated embodiment of the locale specification field 1226 includes a variable number of bytes divided into two sub-fields: a locale string length field 1246 and a locale string field 1248. The locale string length field 1246 includes eight bits that indicate a length of the locale string field 1248. The locale string field 1248 of the locale specification field 1226 may be variable in length and contain a string of UTF-8 characters encoding a local description based on Portable Operating System Interface (POSIX) locale codes. The standard format for POSIX locale codes is [language[_territory][.codeset][@modifier]] For example, the POSIX representation for Australian English is en_A-U.UTF8.

f. Integrity Types Supported

Figure 24:
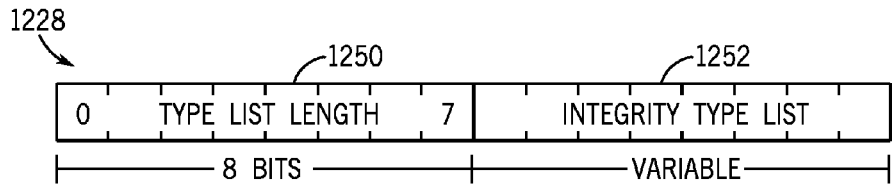
FIG. 24 illustrates an integrity types supported field of the image query frame of FIG. 19, in accordance with an embodiment.

An embodiment of the integrity types field 1228 is illustrated in FIG. 24. The integrity types supported field 1228 includes two to four bytes of data divided into two sub-fields: a type list length field 1250 and an integrity type list field 1252. The type list length field 1250 includes eight bits that indicate the length in bytes of the integrity type list field 1252. The integrity type list field 1252 indicates the value of the software update integrity type attribute of the software update client 1198. In some embodiments, the integrity type may be derived from Table 10 below.

TABLE 10

Example integrity types

| Value | Integrity Type |
|---|---|
| 0x00 | SHA-160 |
| 0x01 | SHA-256 |
| 0x02 | SHA-512 |

The integrity type list field 1252 may contain at least one element from Table 10 or other additional values not included.

g. Update Schemes Supported

Figure 25:
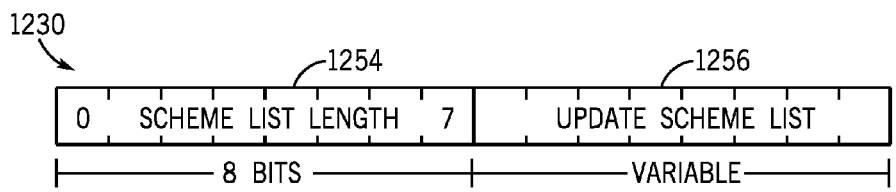
FIG. 25 illustrates an update schemes supported field of the image query frame of FIG. 19, in accordance with an embodiment.

An embodiment of the schemes supported field 1230 is illustrated in FIG. 25. The schemes supported field 1230 includes a variable number of bytes divided into two sub-fields: a scheme list length field 1254 and an update scheme list field 1256. The scheme list length field 1254 includes eight bits that indicate a length of the update scheme list field in bytes. The update scheme list field 1256 of the update schemes supported field 1222 is variable in length determined by the scheme list length field 1254. The update scheme list field 1256 represents an update schemes attributes of the software update profile of the software update client 1198. An embodiment of example values is shown in Table 11 below.

TABLE 11

Example update schemes

| Value | Update Scheme |
|---|---|
| 0x00 | HTTP |
| 0x01 | HTTPS |
| 0x02 | SFTP |
| 0x03 | Fabric-specific File Transfer Protocol (e.g., Bulk Data Transfer discussed below) |

Upon receiving the image query message 1206, the software update server 1200 uses the transmitted information to determine whether the software update server 1200 has an update for the software update client 1198 and how best to deliver the update to the software update client 1198.

4. Image Query Response

Returning to FIG. 18, after the software update server 1200 receives the image query message 1206 from the software update client 1198, the software update server 1200 responds with an image query response 1208. The image query response 1208 includes either information detailing why an update image is not available to the software update client 1198 or information about the available image update to enable to software update client 1198 to download and install the update.

Figure 26:
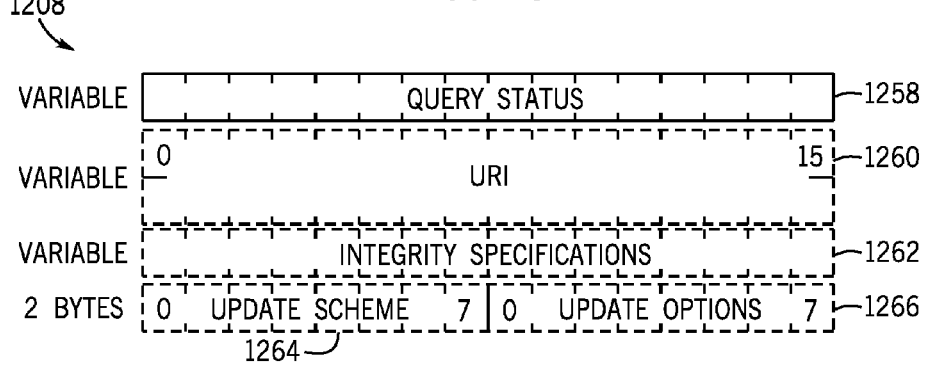
FIG. 26 illustrates an image query response frame that may be used in the protocol sequence of FIG. 18, in accordance with an embodiment.

An embodiment of a frame of the image query response 1208 is illustrated in FIG. 26. As illustrated, the image query response 1208 includes five possible sub-fields: a query status field 1258, a uniform resource identifier (URI) field 1260, an integrity specification field 1262, an update scheme field 1264, and an update options field 1266.

a. Query Status

The query status field 1258 includes a variable number of bytes and contains status reporting formatted data, as discussed above in reference to status reporting. For example, the query status field 1258 may include image query response status codes, such as those illustrated below in Table 12.

TABLE 12

Example image query response status codes

| Profile | Code | Description |
|---|---|---|
| 0x00000000 | 0x0000 | The server has processed the image query message 1206 and has an update for the software update client 1198. |
| 0x0000000C | 0x0001 | The server has processed the image query message 1206, but the server does not have an update for the software update client 1198. |
| 0x00000000 | 0x0010 | The server could not process the request because of improper form for the request. |
| 0x00000000 | 0x0020 | The server could not process the request due to an internal error | b. URI

Figure 27:
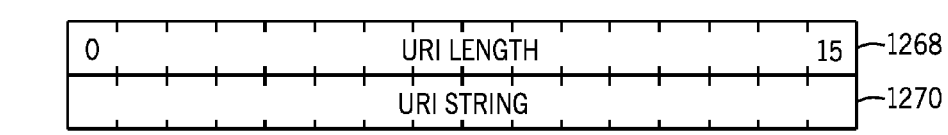
FIG. 27 illustrates a uniform resource identifier (URI) field of the image query response frame of FIG. 26, in accordance with an embodiment.

The URI field 1260 includes a variable number of bytes. The presence of the URI field 1260 may be determined by the query status field 1258. If the query status field 1258 indicates that an update is available, the URI field 1260 may be included. An embodiment of the URI field 1260 is illustrated in FIG. 27. The URI field 1260 includes two sub-fields: a URI length field 1268 and a URI string field 1270. The URI length field 1268 includes sixteen bits that indicates the length of the URI string field 1270 in UTF-8 characters. The URI string field 1270 and indicates the URI attribute of the software image update being presented, such that the software update client 1198 may be able to locate, download, and install a software image update, when present.

c. Integrity Specification

Figure 28:
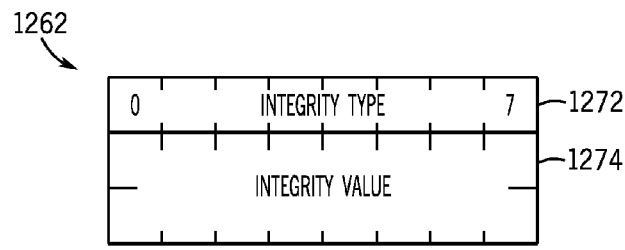
FIG. 28 illustrates a integrity specification field of the image query response frame of FIG. 26, in accordance with an embodiment.

The integrity specification field 1262 may variable in length and present when the query status field 1258 indicates that an update is available from the software update server 1198 to the software update client 1198. An embodiment of the integrity specification field 1262 is illustrated in FIG. 28. As illustrated, the integrity specification field 1262 includes two sub-fields: an integrity type field 1272 and an integrity value field 1274. The integrity type field 1272 includes eight bits that indicates an integrity type attribute for the software image update and may be populated using a list similar to that illustrated in Table 10 above. The integrity value field 1274 includes the integrity value that is used to verify that the image update message has maintained integrity during the transmission.

d. Update Scheme

The update scheme field 1264 includes eight bits and is present when the query status field 1258 indicates that an update is available from the software update server 1198 to the software update client 1198. If present, the update scheme field 1264 indicates a scheme attribute for the software update image being presented to the software update server 1198.

e. Update Options

Figure 29:
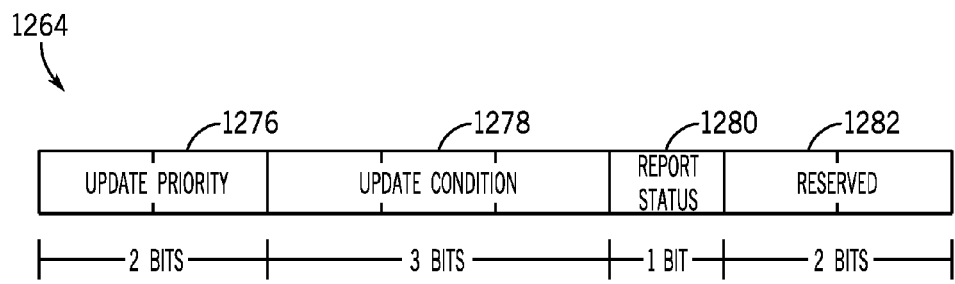
FIG. 29 illustrates an update scheme field of the image query response frame of FIG. 26, in accordance with an embodiment.

The update options field 1266 includes eight bits and is present when the query status field 1258 indicates that an update is available from the software update server 1198 to the software update client 1198. The update options field 1266 may be sub-divided as illustrated in FIG. 29. As illustrated, the update options field 1266 includes four sub-fields: an update priority field 1276, an update condition field 1278, a report status flag 1280, and a reserved field 1282. In some embodiments, the update priority field 1276 includes two bits. The update priority field 1276 indicates a priority attribute of the update and may be determined using values such as those illustrated in Table 13 below.

TABLE 13

Example update priority values

| Value | Description |
|---|---|
| 00 | Normal—update during a period of low network traffic |
| 01 | Critical—update as quickly as possible |

The update condition field 1278 includes three bits that may be used to determine conditional factors to determine when or if to update. For example, values in the update condition field 1278 may be decoded using the Table 14 below.

TABLE 14

Example update conditions

| Value | Decryption |
|---|---|
| 0 | Update without conditions |
| 1 | Update if the version of the software running on the update client software does not match the update version. |
| 2 | Update if the version of the software running on the update client software is older than the update version. |
| 3 | Update if the user opts into an update with a user interface |

The report status flag 1280 is a single bit that indicates whether the software update client 1198 should respond with a download notify message 1210. If the report status flag 1280 is set to 1 the software update server 1198 is requesting a download notify message 1210 to be sent after the software update is downloaded by the software update client 1200.

If the image query response 1208 indicates that an update is available. The software update client 1198 downloads 1210 the update using the information included in the image query response 1208 at a time indicated in the image query response 1208.

5. Download Notify

After the update download 1210 is successfully completed or failed and the report status flag 1280 value is 1, the software update client 1198 may respond with the download notify message 1212. The download notify message 1210 may be formatted in accordance with the status reporting format discussed above. An example of status codes used in the download notify message 1212 is illustrated in Table 15 below.

TABLE 15

Example download notify status codes

| Profile | Code | Description |
|---|---|---|
| 0x00000000 | 0x0000 | The download has been completed, and integrity verified |
| 0x0000000C | 0x0020 | The download could not be completed due to faulty download instructions. |
| 0x0000000C | 0x0021 | The image query response message 1208 appears proper, but the download or integrity verification failed. |
| 0x0000000C | 0x0022 | The integrity of the download could not be verified. |

In addition to the status reporting described above, the download notify message 1208 may include additional status information that may be relevant to the download and/or failure to download.

6. Notify Response

The software update server 1200 may respond with a notify response message 1214 in response to the download notify message 1212 or an update notify message 1216. The notify response message 1214 may include the status reporting format, as described above. For example, the notify response message 1214 may include status codes as enumerated in Table 16 below.

TABLE 16

Example notify response status codes

| Profile | Code | Description |
|---|---|---|
| 0x00000000 | 0x0030 | Continue—the notification is acknowledged, but the update has not completed, such as download notify message 1214 received but update notify message 1216 has not. |
| 0x00000000 | 0x0000 | Success—the notification is acknowledged, and the update has completed. |
| 0x0000000C | 0x0023 | Abort—the notification is acknowledged, but the server cannot continue the update. |
| 0x0000000C | 0x0031 | Retry query—the notification is acknowledged, and the software update client 1198 is directed to retry the update by submitting another image query message 1206. |

In addition to the status reporting described above, the notify response message 1214 may include additional status information that may be relevant to the download, update, and/or failure to download/update the software update.

7. Update Notify

After the update is successfully completed or failed and the report status flag 1280 value is 1, the software update client 1198 may respond with the update notify message 1216. The update notify message 1216 may use the status reporting format described above. For example, the update notify message 1216 may include status codes as enumerated in Table 17 below.

TABLE 17

Example update notify status codes

| Profile | Code | Description |
|---|---|---|
| 0x00000000 | 0x0000 | Success—the update has been completed. |
| 0x0000000C | 0x0010 | Client error—the update failed due to a problem in the software update client 1198. |

In addition to the status reporting described above, the update notify message 1216 may include additional status information that may be relevant to the update and/or failure to update.

C. Data Management Protocol

Figure 30:
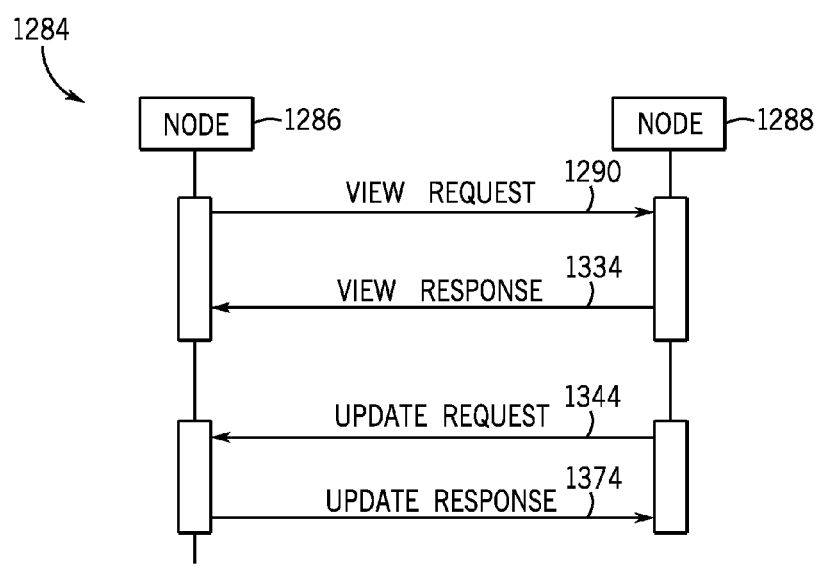
FIG. 30 illustrates a sequence used to employ a data management protocol to manage data between devices in the fabric network, in accordance with an embodiment.

Data management may be included in a common profile (e.g., core profile) used in various electronic devices within the fabric or may be designated as a separate profile. In either situation, the device management protocol (DMP) may be used for nodes to browse, share, and/or update node-resident information. A sequence 1284 used in the DMP is illustrated in FIG. 30. The sequence 1284 illustrates a viewing node 1286 that requests to view and/or change resident data of a viewed node 1288. Additionally, the viewing node 1286 may request to view the resident data using one of several viewing options, such as a snapshot request, a watching request that the viewing persists over a period of time, or other suitable viewing type. Each message follows the format for the Application Payload 1146 described in reference to FIG. 15. For example, each message contains a profile Id 1176 that corresponds to the data management profile and/or the relevant core profile, such as 0x235A0000. Each message also contains a message type 1172. The message type 1172 may be used to determine various factors relating the conversation, such as viewing type for the view. For example, in some embodiments, the message type field 1172 may be encoded/decoded according to Table 18 below.

TABLE 18

Example software update profile message types

| Type | Message |
|---|---|
| 0x00 | snapshot request |
| 0x01 | watch request |
| 0x02 | periodic update request |
| 0x03 | refresh update |
| 0x04 | cancel view update |
| 0x05 | view response |
| 0x06 | explicit update request |
| 0x07 | view update request |
| 0x08 | update response | i. View Request

Although a view request message 1290 requests to view node-resident data, the type of request may be determined by the message type field 1172, as discussed above. Accordingly each request type may include a different view request frame.

1. Snapshot Request

A snapshot request may be sent by the viewing node 1286 when the viewing node 1286 desires an instantaneous view into the node-resident data on the viewed node 1288 without requesting future updates. An embodiment of a snapshot request frame 1292 is illustrated in FIG. 31.

As illustrated in FIG. 31, the snapshot request frame 1292 may be variable in length and include three fields: a view handle field 1294, a path length list field 1296, and a path list field 1298. The view handle field 1294 may include two bits that provide a "handle" to identify the requested view. In some embodiments, the view handle field 1294 is populated using a random 16-bit number or a 16-bit sequence number along with a uniqueness check performed on the viewing node 1286 when the request is formed. The path list length field 1296 includes two bytes that indicate a length of the path list field 1298. The path list field 1298 is variable in length and indicated by the value of the path list length field 1296. The value of the path list field 1298 indicates a schema path for nodes.

A schema path is a compact description for a data item or container that is part of a schema resident on the nodes. For example, FIG. 32 provides an example of a profile schema 1300. In the illustrated profile schema 1300, a path to data item 1302 may be written as "Foo:bicycle:mountain" in a binary format. The binary format of the path may be represented as a profile binary format 1304, as depicted in FIG. 33. The profile binary format 1304 includes two sub-fields: a profile identifier field 1306 and a TLV data field 1308. The profile identifier field 1306 identifies which profile is being referenced (e.g., Foo profile). The TLV data field 1308 path information. As previously discussed TLV data includes a tag field that includes information about the enclosed data. Tag field values used to refer to the Foo profile of FIG. 32 may be similar to those values listed in Table 19.

TABLE 19

Example tag values for the Foo profile

| Name | Tag |
|---|---|
| animal | 0x4301 |
| fish | 0x4302 |
| fowl | 0x4303 |
| medium | 0x4304 |
| size | 0x4305 |
| bicycle | 0x4306 |
| road | 0x4307 |
| mountain | 0x4308 |
| track | 0x4309 |
| # of gears | 0x430A |
| weight | 0x430B |

Using Table 19 and the Foo profile of FIG. 32, a binary string in TLV format representing the path "Foo:bicycle:mountain" may be represented as shown in Table 20 below.

TABLE 20

Example binary tag list for a schema path

| Profile ID | Tag and Length (TL) | "bicycle" | "mountain" |
|---|---|---|---|
| CD:AB:00:00 | 0D:02 | 06:43 | 08:43 |

If the viewing node 1286 desires to receive an entire data set defined in a profile schema (e.g. Foo profile schema of FIG. 33), the view request message 1290 may request a "nil" item (e.g., 0x0D00 TL and an empty length referring to the container.

2. Watch Request

Figure 34:
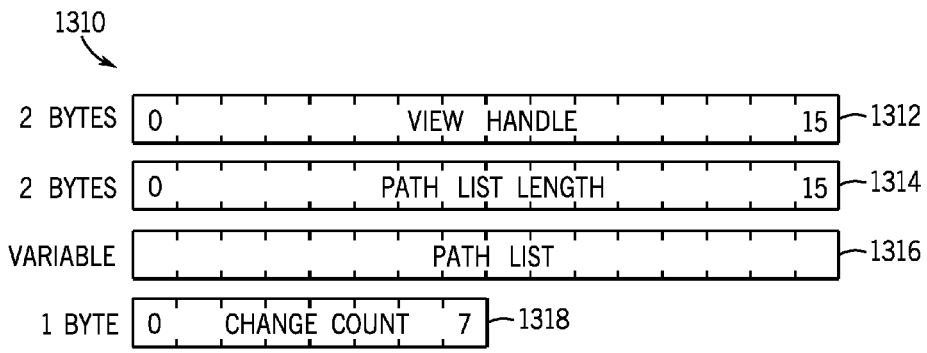
FIG. 34 illustrates a watch request frame that may be used in the sequence of FIG. 30, in accordance with an embodiment.

If the viewing node 1286 desires more than a snapshot, the viewing node 1286 may request a watch request. A watch request asks the viewed node 1288 to send updates when changes are made to the data of interest in viewed node 1288 so that viewing node 1286 can keep a synchronized list of the data. The watch request frame may have a different format than the snapshot request of FIG. 31. An embodiment of a watch request frame 1310 is illustrated in FIG. 34. The watch request frame 1310 includes four fields: a view handle field 1312, a path list length field 1314, a path list field 1316, and a change count field 1318. The view handle field 1312, the path list length field 1314, and the path list field may be respectively formatted similar to the view handle field 1294, the path list length field 1296, and the path list field 1298 of the snapshot request of FIG. 31. The additional field, the change count field 1318, indicates a threshold of a number of changes to the requested data at which an update is sent to the viewing node 1286. In some embodiments, if the value of the change count field 1318 is 0, the viewed node 1288 may determine when to send an update on its own. If the value of the change count field 1318 is nonzero then after a number of changes equal to the value, then an update is sent to the viewing node 1286.

3. Periodic Update Request

Figure 35:
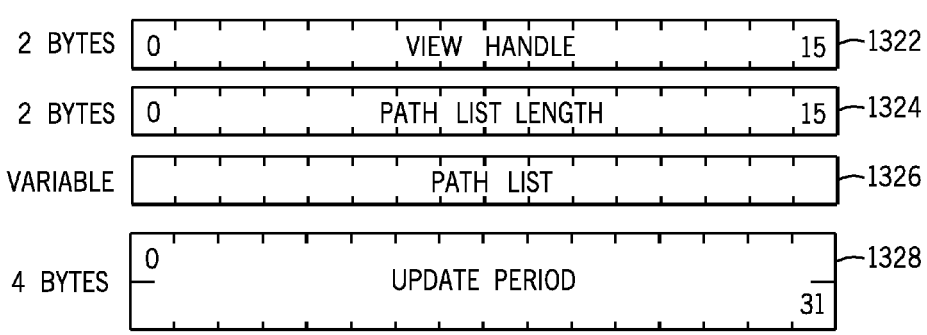
FIG. 35 illustrates a periodic update request frame that may be used in the sequence of FIG. 30, in accordance with an embodiment.

A third type of view may also be requested by the viewing node 1286. This third type of view is referred to as a periodic update. A periodic update includes a snapshot view as well as periodic updates. As can be understood, a periodic update request may be similar to the snapshot request with additional information determining the update period. For example, an embodiment of a periodic update request frame 1320 is depicted in FIG. 35. The periodic update request frame 1320 includes four fields: a view handle field 1322, a path list length field 1324, a path list field 1326, and an update period field 1328. The view handle field 1322, the path list length field 1324, and the path list field 1326 may be formatted similar to their respective fields in the snapshot request frame 1292. The update period field 1328 is four bytes in length and contains a value that corresponds to a period of time to lapse between updates in a relevant unit of time (e.g., seconds).

4. Refresh Request

Figure 36:
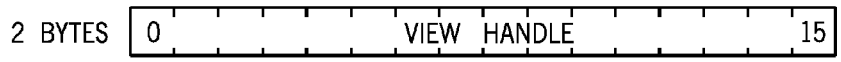
FIG. 36 illustrates a refresh request frame that may be used in the sequence of FIG. 30, in accordance with an embodiment.

When the viewing node 1286 desires to receive an updated snapshot, the viewing node 1286 may send a view request message 1290 in the form of a refresh request frame 1330 as illustrated in FIG. 36. The refresh request frame 1330 essentially resends a snapshot view handle field (e.g., view handle field 1294) from a previous snapshot request that the viewed node 1288 can recognize as a previous request using the view handle value in the refresh request frame 1330.

5. Cancel View Request

Figure 37:
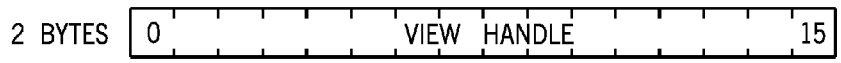
FIG. 37 illustrates a cancel view request that may be used in the sequence of FIG. 30, in accordance with an embodiment.

When the viewing node 1286 desires to cancel an ongoing view (e.g., periodic update or watch view), the viewing node 1286 may send a view request message 1290 in the form of a cancel view request frame 1332 as illustrated in FIG. 37. The cancel view request frame 1332 essentially resends a view handle field from a previous periodic update or watch view (e.g., view handle fields 1310, or 1322) from a previous request that the viewed node 1288 can recognize as a previous request using the view handle value in the refresh request frame 1330 and to cancel a currently periodic update or watch view.

ii. View Response

Figure 38:
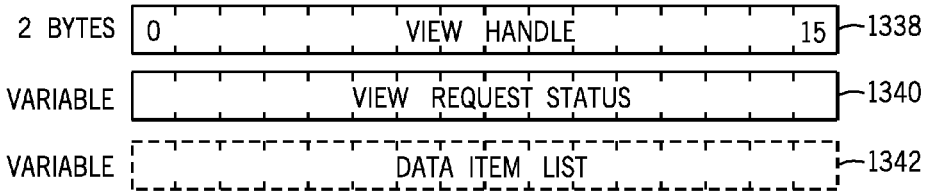
FIG. 38 illustrates a view response frame that may be used in the sequence of FIG. 30, in accordance with an embodiment.

Returning to FIG. 30, after the viewed node 1288 receives a view request message 1290, the viewed node 1288 responds with a view response message 1334. An example of a view response message frame 1336 is illustrated in FIG. 38. The view response message frame 1336 includes three fields: a view handle field 1338, a view request status field 1240, and a data item list 1242. The view handle field 1338 may be formatted similar to any of the above referenced view handle fields 1338. Additionally, the view handle field 1338 contains a value that matches a respective view handle field from the view request message 1290 to which the view response message 1334 is responding. The view request status field 1340 is a variable length field that indicates a status of the view request and may be formatted according to the status updating format discussed above. The data item list field 1342 is a variable length field that is present when the view request status field 1340 indicates that the view request was successful. When present, the data item list field 1342 contains an ordered list of requested data corresponding to the path list of the view request message 1290. Moreover, the data in the data item list field 1342 may be encoded in a TLV format, as discussed above.

iii. Update Request

As discussed above, in some embodiments, the viewed node 1288 may send updates to the viewing node 1286. These updates may be sent as an update request message 1344. The update request message 1344 may include a specified format dependent upon a type of update request. For example, an update request may be an explicit update request or a view update request field that may be identified by the Message Id 1172.

1. Explicit Update Request

Figure 39:
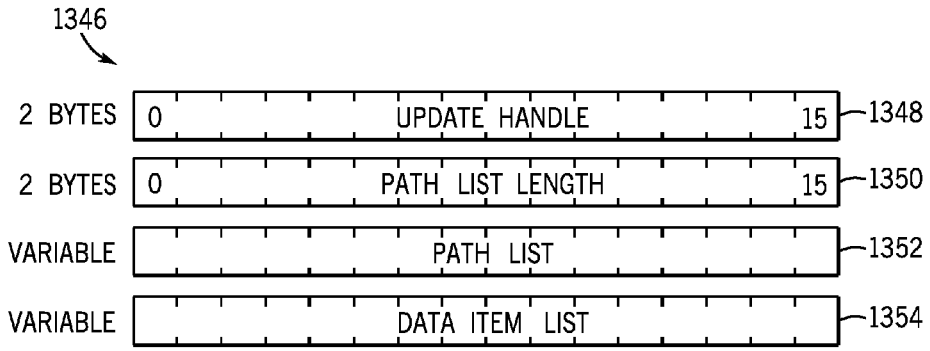
FIG. 39 illustrates an explicit update request frame that may be used in the sequence of FIG. 30, in accordance with an embodiment.

An explicit update request may be transmitted at any time as a result of a desire for information from another node in the fabric 1000. An explicit update request may be formatted in an update request frame 1346 illustrated in FIG. 39. The illustrated update request frame 1346 includes four fields: an update handle field 1348, a path list length field 1350, a path list field 1352, and a data item list field 1354.

The update handle field 1348 includes two bytes that may be populated with random or sequential numbers with uniqueness checks to identify an update request or responses to the request. The path list length field 1350 includes two bytes that indicate a length of the path list field 1352. The path list field 1352 is a variable length field that indicates a sequence of paths, as described above. The data item list field 1354 may be formatted similar to the data item list field 1242.

2. View Update Request

Figure 40:
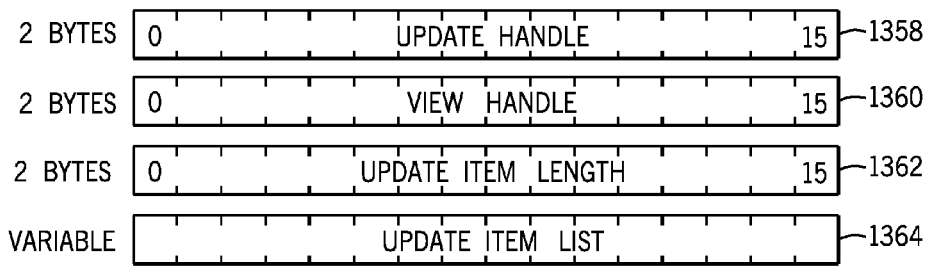
FIG. 40 illustrates a view update request frame that may be used in the sequence of FIG. 30, in accordance with an embodiment.

A view update request message may be transmitted by a node that has previously requested a view into a schema of another node or a node that has established a view into its own data on behalf of another node. An embodiment of a view update request frame 1356 illustrated in FIG. 40. The view update request frame 1356 includes four fields: an update handle field 1358, a view handle field 1360, an update item list length field 1362, and an update item list field 1364. The update handle field 1358 may be composed using the format discussed above in reference to the update handle field 1348. The view handle field 1360 includes two bytes that identify the view created by a relevant view request message 1290 having the same view handle. The update item list length field 1362 includes two bytes and indicates the number of update items that are included in the update item list field 1364.

Figure 41:
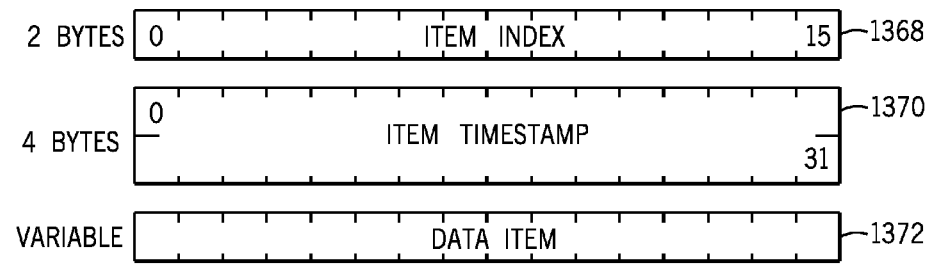
FIG. 41 illustrates an update item frame that may be updated using the sequence of FIG. 30, in accordance with an embodiment.

The update item list field 1364 includes a variable number of bytes and lists the data items constituting the updated values. Each updated item list may include multiple update items. The individual update items are formatted accordingly to the update item frame 1366 illustrated in FIG. 41. Each update item frame 1366 includes three sub-fields: an item index field 1368, an item timestamp field 1370, and a data item field 1372. The item index field 1368 includes two bytes that indicate the view under which the update is being requested and the index in the path list of that view for the data item field 1372.

The item timestamp field 1370 includes four bytes and indicates the elapsed time (e.g., in seconds) from the change until the update being communicated was made. If more than one change has been made to the data item, the item timestamp field 1370 may indicate the most recent or the earliest change. The data item field 1372 is a variable length field encoded in TLV format that is to be received as the updated information.

iv. Update Response

Figure 42:
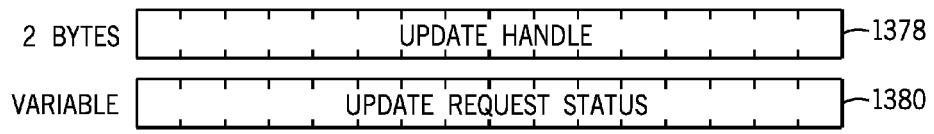
FIG. 42 illustrates an update response frame that may be sent as an update response message in the sequence FIG. 30, in accordance with an embodiment.

After an update is received, a node (e.g., viewing node 1286) may send an update response message 1374. The update response message 1374 may be encoded using an update response frame 1376 illustrated in FIG. 42. The update response frame 1376 includes two fields: an update handle field 1378 and an update request status field 1380. The update handle field 1378 corresponds to an update handle field value of the update request message 1344 to which the update response message 1374 is responding. The update request status field 1380 reports a status of the update in accordance with the status reporting format discussed above. Additionally, a profile using the DMP (e.g., a core profile or a data management profile) may include profile-specific codes, such as those enumerated in Table 21 below.

TABLE 21

Example of status codes for a profile including the DMP

| Name | Value | Description |
| --- | --- | --- |
| success | 0x0000 | Request successfully processed |
| ill-formed request | 0x0010 | Received request was unparseable (e.g., missing fields, extra fields, etc.) |
| invalid path | 0x0011 | A path from the path list of the view or update request did not match a node-resident schema of the responding device. |
| unknown view handle | 0x0012 | The view handle in the update request did not match a view on the receiving node. |
| illegal read request | 0x0013 | The node making a request to read a particular data item does not have permission to do so. |
| illegal write request | 0x0014 | The node making the request to write a particular data item does not have permission to do so. |
| internal server error | 0x0020 | The server could not process the request because of an internal error. |
| out of memory | 0x0021 | The update request could not executed because it would overrun the available memory in the receiving device. |
| continue | 0x0030 | The request was successfully handled but more action by the requesting device may occur. |

D. Bulk Transfer

In some embodiments, it may be desirable to transfer bulk data files (e.g., sensor data, logs, or update images) between nodes/services in the fabric 1000. To enable transfer of bulk data, a separate profile or protocol may be incorporated into one or more profiles and made available to the nodes/services in the nodes. The bulk data transfer protocol may model data files as collections of data with metadata attachments. In certain embodiments, the data may be opaque, but the metadata may be used to determine whether to proceed with a requested file transfer.

Figure 43:
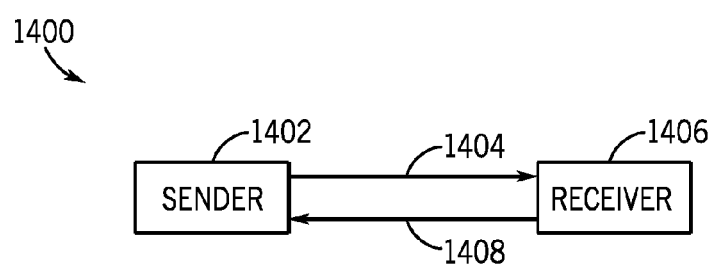
FIG. 43 illustrates a communicative connection between a sender and a receiver in a bulk data transfer, in accordance with an embodiment.

Devices participating in a bulk transfer may be generally divided according to the bulk transfer communication and event creation. As illustrated in FIG. 43, each communication 1400 in a bulk transfer includes a sender 1402 that is a node/service that sends the bulk data 1404 to a receiver 1406 that is a node/service that receives the bulk data 1404. In some embodiments, the receiver may send status information 1408 to the sender 1402 indicating a status of the bulk transfer. Additionally, a bulk transfer event may be initiated by either the sender 1402 (e.g., upload) or the receiver 1406 (e.g., download) as the initiator. A node/service that responds to the initiator may be referred to as the responder in the bulk data transfer.

Bulk data transfer may occur using either synchronous or asynchronous modes. The mode in which the data is transferred may be determined using a variety of factors, such as the underlying protocol (e.g., UDP or TCP) on which the bulk data is sent. In connectionless protocols (e.g., UDP), bulk data may be transferred using a synchronous mode that allows one of the nodes/services ("the driver") to control a rate at which the transfer proceeds. In certain embodiments, after each message in a synchronous mode bulk data transfer, an acknowledgment may be sent before sending the next message in the bulk data transfer. The driver may be the sender 1402 or the receiver 1406. In some embodiments, the driver may toggle between an online state and an offline mode while sending messages to advance the transfer when in the online state. In bulk data transfers using connection-oriented protocols (e.g., TCP), bulk data may be transferred using an asynchronous mode that does not use an acknowledgment before sending successive messages or a single driver.

Regardless of whether the bulk data transfer is performed using a synchronous or asynchronous mode, a type of message may be determined using a Message Type 1172 in the Application Payload 1146 according the Profile Id 1176 in the Application Payload. Table 22 includes an example of message types that may be used in relation to a bulk data transfer profile value in the Profile Id 1176.

TABLE 22

Examples of message types for bulk data transfer profiles

| Message Type | Message |
| --- | --- |
| 0x01 | SendInit |
| 0x02 | SendAccept |
| 0x03 | SendReject |
| 0x04 | ReceiveInit |
| 0x05 | ReceiveAccept |
| 0x06 | ReceiveReject |
| 0x07 | BlockQuery |
| 0x08 | Block |
| 0x09 | BlockEOF |
| 0x0A | Ack |
| 0x0B | Block EOF |
| 0x0C | Error | i. SendInit

Figure 44:
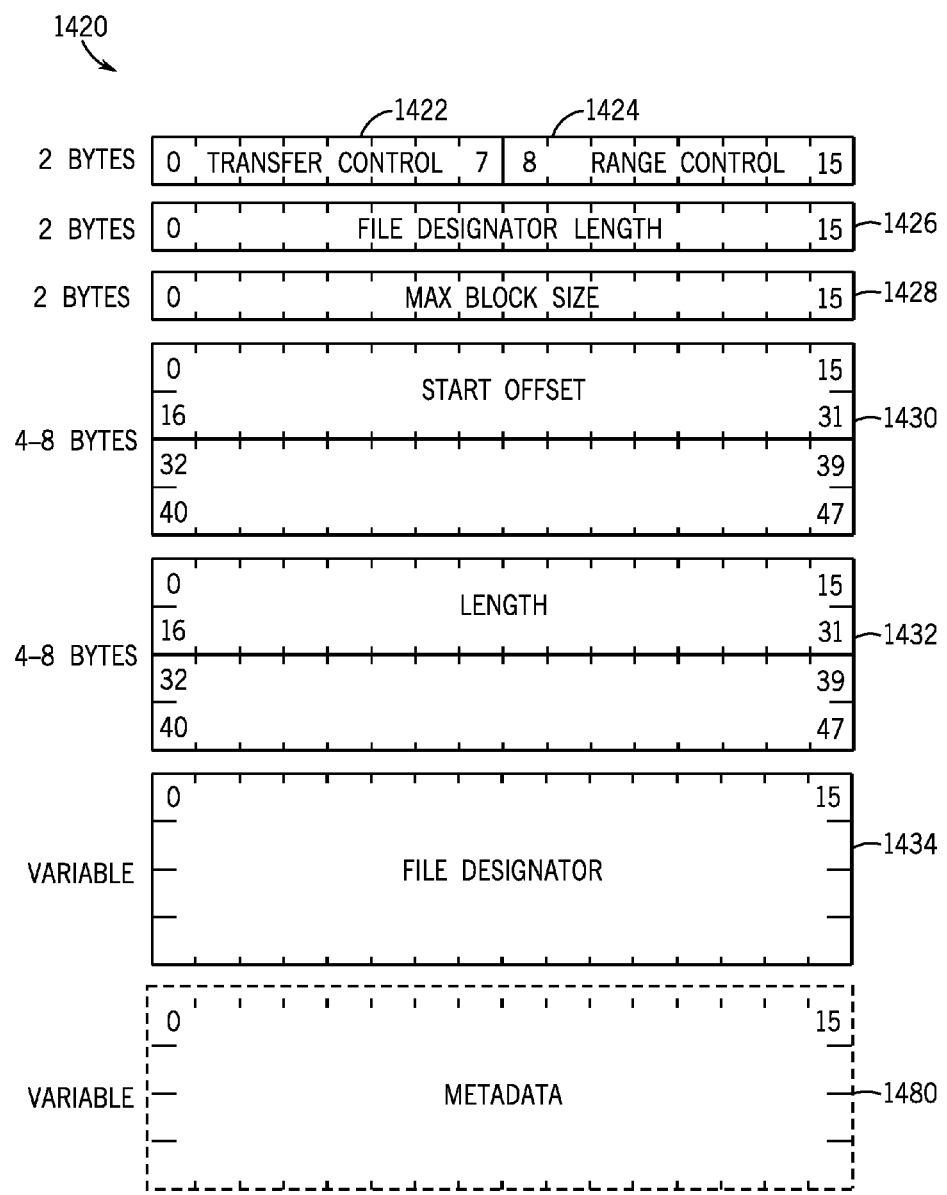
FIG. 44 illustrates a SendInit message that may be used to initiate the communicative connection by the sender of FIG. 43, in accordance with an embodiment.

An embodiment of a SendInit message 1420 is illustrated in FIG. 44. The SendInit message 1420 may include seven fields: a transfer control field 1422, a range control field 1424, a file designator length field 1426, a proposed max block size field 1428, a start offset field 1430, length field 1432, and a file designator field 1434.

Figure 45:
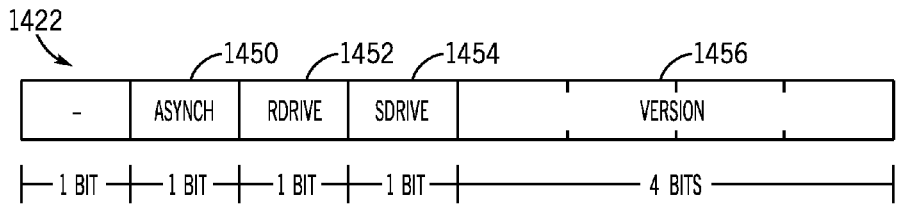
FIG. 45 illustrates a transfer control field of the SendInit message of FIG. 44, in accordance with an embodiment.

The transfer control field 1422 includes a byte of data illustrated in FIG. 45. The transfer control field includes at least four fields: an Asynch flag 1450, an RDrive flag 1452, an SDrive flag 1454, and a version field 1456. The Asynch flag 1450 indicates whether the proposed transfer may be performed using a synchronous or an asynchronous mode. The RDrive flag 1452 and the SDrive flag 1454 each respectively indicates whether the receiver 1406 is capable of transferring data with the receiver 1402 or the sender 1408 driving a synchronous mode transfer.

Figure 46:
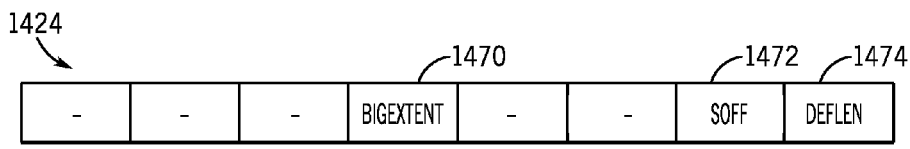
FIG. 46 illustrates a range control field of the SendInit message of FIG. 45, in accordance with an embodiment.

The range control field 1424 includes a byte of data such as the range control field 1424 illustrated in FIG. 46. In the illustrated embodiment, the range control field 1424 includes at least three fields: a BigExtent flag 1470, a start offset flag 1472, and a definite length flag 1474. The definite length flag 1474 indicates whether the transfer has a definite length. The definite length flag 1474 indicates whether the length field 1432 is present in the SendInit message 1420, and the BigExtent flag 1470 indicates a size for the length field 1432. For example, in some embodiments, a value of 1 in the BigExtent flag 1470 indicates that the length field 1432 is eight bytes. Otherwise, the length field 1432 is four bytes, when present. If the transfer has a definite length, the start offset flag 1472 indicates whether a start offset is present. If a start offset is present, the BigExtent flag 1470 indicates a length for the start offset field 1430. For example, in some embodiments, a value of 1 in the BigExtent flag 1470 indicates that the start offset field 1430 is eight bytes. Otherwise, the start offset field 1430 is four bytes, when present.

Returning to FIG. 44, the file designator length field 1426 includes two bytes that indicate a length of the file designator field 1434. The file designator field 1434 which is a variable length field dependent upon the file designator length field 1426. The max block size field 1428 proposes a maximum size of block that may be transferred in a single transfer.

The start offset field 1430, when present, has a length indicated by the BigExtent flag 1470. The value of the start offset field 1430 indicates a location within the file to be transferred from which the sender 1402 may start the transfer, essentially allowing large file transfers to be segmented into multiple bulk transfer sessions.

The length field 1432, when present, indicates a length of the file to be transferred if the definite length field 1474 indicates that the file has a definite length. In some embodiments, if the receiver 1402 receives a final block before the length is achieved, the receiver may consider the transfer failed and report an error as discussed below.

The file designator field 1434 is a variable length identifier chosen by the sender 1402 to identify the file to be sent. In some embodiments, the sender 1402 and the receiver 1406 may negotiate the identifier for the file prior to transmittal. In other embodiments, the receiver 1406 may use metadata along with the file designator field 1434 to determine whether to accept the transfer and how to handle the data. The length of the file designator field 1434 may be determined from the file designator length field 1426. In some embodiments, the SendInit message 1420 may also include a metadata field 1480 of a variable length encoded in a TLV format. The metadata field 1480 enables the initiator to send additional information, such as application-specific information about the file to be transferred. In some embodiments, the metadata field 1480 may be used to avoid negotiating the file designator field 1434 prior to the bulk data transfer.

ii. SendAccept

Figure 47:
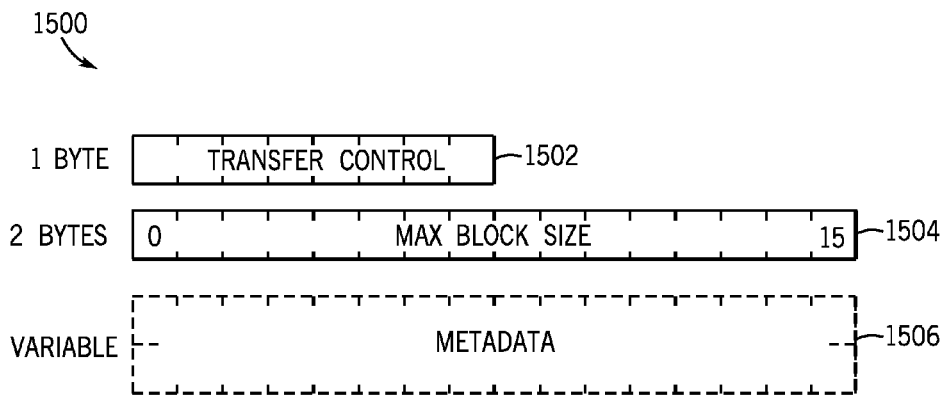
FIG. 47 illustrates a SendAccept message that may be used to accept a communicative connection proposed by the SendInit message of FIG. 44 sent by the sender of FIG. 44, in accordance with an embodiment.

A send accept message is transmitted from the responder to indicate the transfer mode chosen for the transfer. An embodiment of a SendAccept message 1500 is presented in FIG. 47. The SendAccept message 1500 includes a transfer control field 1502 similar to the transfer control field 1422 of the SendInit message 1420. However, in some embodiments, only the RDrive flag 1452 or the SDrive 1454 may have a nonzero value in the transfer control field 1502 to identify the sender 1402 or the receiver 1406 as the driver of a synchronous mode transfer. The SendAccept message 1500 also includes a max block size field 1504 that indicates a maximum block size for the transfer. The block size field 1504 may be equal to the value of the max block field 1428 of the SendInit message 1420, but the value of the max block size field 1504 may be smaller than the value proposed in the max block field 1428. Finally, the SendAccept message 1500 may include a metadata field 1506 that indicates information that the receiver 1506 may pass to the sender 1402 about the transfer.

iii. SendReject

Figure 48:
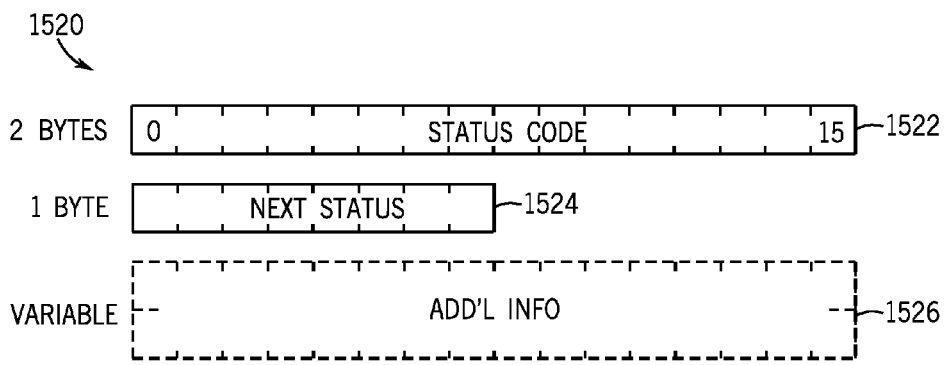
FIG. 48 illustrates a SendReject message that may be used to reject a communicative connection proposed by the SendInit message of FIG. 44 sent by the sender of FIG. 44, in accordance with an embodiment.

When the receiver 1206 rejects a transfer after a SendInit message, the receiver 1206 may send a SendReject message that indicates that one or more issues exist regarding the bulk data transfer between the sender 1202 and the receiver 1206. The send reject message may be formatted according to the status reporting format described above and illustrated in FIG. 48. A send reject frame 1520 may include a status code field 1522 that includes two bytes that indicate a reason for rejecting the transfer. The status code field 1522 may be decoded using values similar to those enumerated as indicated in the Table 23 below.

TABLE 23

Example status codes for send reject message

| Status Code | Description |
|---|---|
| 0x0020 | Transfer method not supported |
| 0x0021 | File designator unknown |
| 0x0022 | Start offset not supported |
| 0x0011 | Length required |
| 0x0012 | Length too large |
| 0x002F | Unknown error |

In some embodiments, the send reject message 1520 may include a next status field 1524. The next status field 1524, when present, may be formatted and encoded as discussed above in regard to the next status field 1188 of a status report frame. In certain embodiments, the send reject message 1520 may include an additional information field 1526. The additional information field 1526, when present, may store information about an additional status and may be encoded using the TLV format discussed above.

iv. ReceiveInit

A ReceiveInit message may be transmitted by the receiver 1206 as the initiator. The ReceiveInit message may be formatted and encoded similar to the SendInit message 1480 illustrated in FIG. 44, but the BigExtent field 1470 may be referred to as a maximum length field that specifies the maximum file size that the receiver 1206 can handle.

v. ReceiveAccept

Figure 49:
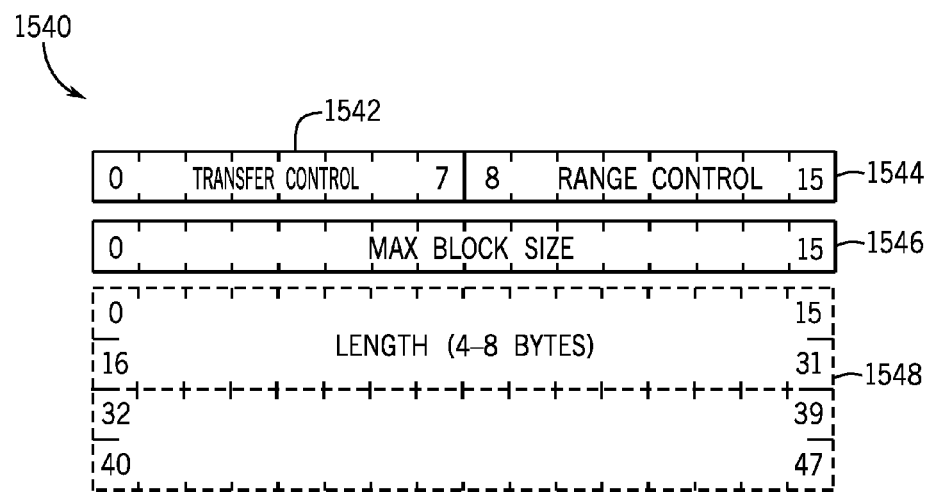
FIG. 49 illustrates a ReceiveAccept message that may be used to accept a communicative connection proposed by the receiver of FIG. 44, in accordance with an embodiment.

When the sender 1202 receives a ReceiveInit message, the sender 1202 may respond with a ReceiveAccept message. The ReceiveAccept message may be formatted and encoded as the ReceiveAccept message 1540 illustrated in FIG. 49. The ReceiveAccept message 1540 may include four fields: a transfer control field 1542, a range control field 1544, a max block size field 1546, and sometimes a length field 1548. The ReceiveAccept message 1540 may be formatted similar to the SendAccept message 1502 of FIG. 47 with the second byte indicating the range control field 1544. Furthermore, the range control field 1544 may be formatted and encoded using the same methods discussed above regarding the range control field 1424 of FIG. 46.

vi. ReceiveReject

If the sender 1202 encounters an issue with transferring the file to the receiver 1206, the sender 1202 may send a ReceiveReject message formatted and encoded similar to a SendReject message 48 using the status reporting format, both discussed above. However, the status code field 1522 may be encoded/decoded using values similar to those enumerated as indicated in the Table 24 below.

TABLE 24

Example status codes for receive reject message

| Status Code | Description |
|---|---|
| 0x0020 | Transfer method not supported |
| 0x0021 | File designator unknown |
| 0x0022 | Start offset not supported |
| 0x0013 | Length too short |
| 0x002F | Unknown error | vii. BlockQuery

A BlockQuery message may be sent by a driving receiver 1202 in a synchronous mode bulk data transfer to request the next block of data. A BlockQuery impliedly acknowledges receipt of a previous block of data if not explicit Acknowledgement has been sent. In embodiments using asynchronous transfers, a BlockQuery message may be omitted from the transmission process.

viii. Block

Blocks of data transmitted in a bulk data transfer may include any length greater than 0 and less than a max block size agreed upon by the sender 1202 and the receiver 1206.

ix. BlockEOF

A final block in a data transfer may be presented as a Block end of file (BlockEOF). The BlockEOF may have a length between 0 and the max block size. If the receiver 1206 finds a discrepancy between a pre-negotiated file size (e.g., length field 1432) and the amount of data actually transferred, the receiver 1206 may send an Error message indicating the failure, as discussed below.

x. Ack

If the sender 1202 is driving a synchronous mode transfer, the sender 1202 may wait until receiving an acknowledgment (Ack) after sending a Block before sending the next Block. If the receiver is driving a synchronous mode transfer, the receiver 1206 may send either an explicit Ack or a BlockQuery to acknowledge receipt of the previous block. Furthermore, in asynchronous mode bulk transfers, the Ack message may be omitted from the transmission process altogether.

xi. AckEOF

An acknowledgement of an end of file (AckEOF) may be sent in bulk transfers sent in synchronous mode or asynchronous mode. Using the AckEOF the receiver 1206 indicates that all data in the transfer has been received and signals the end of the bulk data transfer session.

xii. Error

In the occurrence of certain issues in the communication, the sender 1202 or the receiver 1206 may send an error message to prematurely end the bulk data transfer session. Error messages may be formatted and encoded according to the status reporting format discussed above. For example, an error message may be formatted similar to the SendReject frame 1520 of FIG. 48. However, the status codes may be encoded/decoded with values including and/or similar to those enumerated in Table 25 below.

TABLE 25

Example status codes for an error message in a bulk data transfer profile

| Status code | Description |
| --- | --- |
| 0x001F | Transfer failed unknown error |
| 0x0011 | Overflow error |

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A non-transitory, computer-readable medium having stored thereon a message format, wherein the message format comprises:

a message header field configured to indicate:
  a version of the message format used to format the message;
  whether addressing information is included in the message; and
  whether security information is included in the message;
a packet length field that indicates a length of a packet sent using a connection type used to send the message;
a source node identifier that identifies a source device from which the message originated;
a destination node identifier that identifies a destination device for which the message is directed;
a key identifier that identifies an encryption type used to encrypt at least a portion of the message;
a message integrity check field that may be used to check integrity of the message;
a message ID field configured to identify a message with an identifier that is unique for a device in a fabric network that encodes or sends the message, wherein the message ID field follows the message header field; and
an application payload field following the message ID field and comprising data transmitted from the device within the fabric network.

2. The non-transitory, computer-readable medium of claim 1, wherein the message header field comprises two bytes of data.

3. The non-transitory, computer-readable medium of claim 1, wherein the message ID field comprises four bits of data.

4. The non-transitory, computer-readable medium of claim 1, wherein the application payload field comprises a variable length of data.

5. The non-transitory, computer-readable medium of claim 1, wherein the application payload field comprises data formatted in a tag-length-value format.

6. The non-transitory, computer-readable medium of claim 1, wherein the addressing information comprises a source ID flag that indicates whether a source address for the device is included in the message, wherein the source address indicates the device formatted in a Unique Local Address format comprising:
  a global ID having 40 bits of data configured to identify the fabric network in which the sending device is connected;
  a subnet ID having 16 bits of data configured to identify a logical network in the fabric network in which the sending device is connected; and
  an interface ID having 64 bits of data configured to identify the sending device.

7. The non-transitory, computer-readable medium of claim 1, wherein the addressing information comprises a destination ID flag that indicated whether a destination address is included in the message, wherein the destination address indicates a destination device that is connected to the fabric network, wherein the destination address is formatted in a Unique Local Address format comprising:
  a global ID having 40 bits of data configured to identify the fabric network in which the destination device is connected;
  a subnet ID having 16 bits of data configured to identify a logical network in the fabric network in which the destination device is connected; and
  an interface ID having 64 bits of data configured to identify the sending device.

8. An electronic device configured to send or receive messages to other electronic devices over a platform layer, wherein the messages comprise:

a message format comprising:
- a message header field configured to indicate:
  - a version of the message format used to format the message;
  - whether addressing information is included in the message; and
  - whether security information is included in the message;
- a packet length field that indicates a length of a packet sent using a connection type used to send the message;
- a source node identifier that identifies a source device from which the message originated;
- a destination node identifier that identifies a destination device for which the message is directed;
- a key identifier that identifies an encryption type used to encrypt at least a portion of the message;
- a message integrity check field that may be used to check integrity of the message;
- a message ID field configured to identify a message with an identifier that is unique for a device in a fabric network that encodes or sends the message, wherein the message ID field follows the message header field; and
- an application payload field following the message ID field and comprising data transmitted from the device within the fabric network.

9. The electronic device of claim 8, wherein the message format comprises:
- a message type field immediately following the message header field, wherein the message type field is configured to indicate a message operation code that specifies a type of message being sent;
- an exchange ID field immediately following the version field, wherein the exchange ID field is configured to uniquely identify a discussion in which the message occurs for the electronic device; and
- a profile ID field immediately following the exchange ID field, wherein the profile ID field indicates a profile of a plurality of profiles that enables a receiving device to interpret the message type field and identify at least one schema of a plurality of schemas for transmitted data, wherein each schema of the plurality of schemas indicates an encoding format according to the profile and schema.

10. The electronic device of claim 9, wherein the message format comprises a profile-specific header field that immediately follows the profile ID field and immediately precedes the application payload field, wherein the profile-specific header is included in the message format when the profile field indicates that a profile is included that uses additional information to process the application payload.

11. The electronic device of claim 10, wherein each profile of the plurality of profiles comprises a set of schema of the plurality of schemas.

12. The electronic device of claim 9, wherein the indicated profile comprises:
- a core profile comprising a set of basic schemas available to the electronic device;
- a data management profile comprising a set of data management schemas that enables the electronic device to access data located on the other electronic devices;
- a bulk data transfer profile comprising a set of bulk data transfer schemas that enables the electronic device to transfer bulk data to the other electronic devices or from the electronic devices;
- a status reporting profile comprising a set of status reporting schemas that enables the electronic device to send or receive status information from the other electronic devices; or
- a software update profile comprising a set of software update schemas that enables the electronic device to send or receive software update images from the other electronic devices.

13. The electronic device of claim 9, wherein the version field comprises 8 bits of data.

14. The electronic device of claim 9, wherein the message ID field comprises 4 bits of data.

15. A method for sending and receiving messages between devices in a fabric network, wherein the method comprises:
sending or receiving a message using a general message format, wherein the general message format comprises:
- a message header field configured to indicate:
  - a version of the message format used to format the message;
  - whether addressing information is included in the message; and
  - whether security information is included in the message;
- a packet length field that indicates a length of a packet sent using a connection type used to send the message;
- a source node identifier that identifies a source device from which the message originated;
- a destination node identifier that identifies a destination device for which the message is directed;
- a key identifier that identifies an encryption type used to encrypt at least a portion of the message;
- a message integrity check field that may be used to check integrity of the message;
- a message ID field configured to identify a message with an identifier that is unique for a device in a fabric network that encodes or sends the message, wherein the message ID field follows the message header field; and
- an application payload field following the message ID field and comprising data transmitted from the device within the fabric network.

16. The method of claim 15, wherein the message header field comprises:
- a signature type field; and
- an encryption type field.

17. The method of claim 16, wherein the packet length field immediately precedes the message header field, wherein the packet length field indicates the length of a packet sent using a connection type used to send the message.

18. The method of claim 17, wherein the connection type comprises a Transmission Control Protocol connection.

19. The method of claim 16, wherein the general message format comprises a payload length field following the message ID field and preceding the application payload field, wherein the payload length field comprises 2 bytes and is configured to indicate a length of the application payload field.

20. The method of claim 16, wherein the message integrity check field immediately follows the application payload and has a length based at least in part on an encryption type indicated by the encryption type field.

21. The method of claim 16, wherein the key identifier precedes the application payload field, and comprises two bytes to indicate the encryption or message integrity key used to encrypt the at least a portion of the message indicated by the encryption type field, wherein the security information comprises:
an initialization vector field immediately preceding the application payload field, wherein the initialization vector field comprises an initialization vector used to encrypt the message indicated by the encryption type field;

a padding field following the application payload field, wherein the padding field comprises a length of bytes representing cryptographic padding added to the message to make an encrypted portion of the message evenly divisible by an encryption block size, wherein the encryption portion comprises the application payload field, the message integrity field, and the padding field; or a message signature field located at an end of the message, wherein the message signature field includes a cryptographic signature for the message based at least in part on a signature type indicated by the signature type field.

* * * * *

UNITED STATES PATENT AND TRADEMARK OFFICE
CERTIFICATE OF CORRECTION

PATENT NO. : 9,112,790 B2
APPLICATION NO. : 13/926302
DATED : August 18, 2015
INVENTOR(S) : Jay D. Logue et al.

Page 1 of 1

It is certified that error appears in the above-identified patent and that said Letters Patent is hereby corrected as shown below:

In the claims

In claim 4, column 44, line 29 delete "bits" and insert --bytes--

In claim 9, column 45, lines 31-32 delete "the message header" and insert --a version--

In claim 9, column 45, line 35 delete "version" and insert --message type--

In claim 10, column 45, lines 51-52 insert --ID-- between profile field

In claim 14, column 46, line 12 delete "bits" and insert --bytes--

Signed and Sealed this
Fourteenth Day of June, 2016

Michelle K. Lee
*Director of the United States Patent and Trademark Office*